United States Patent
Ishihara et al.

(10) Patent No.: US 11,674,477 B2
(45) Date of Patent: Jun. 13, 2023

(54) LEAK HOLE DETERMINATION DEVICE OF EVAPORATED FUEL PROCESSING DEVICE

(71) Applicant: DENSO CORPORATION, Kariya (JP)

(72) Inventors: Keiichirou Ishihara, Kariya (JP); Tomohiro Itoh, Kariya (JP); Yasuo Katoh, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/323,340

(22) Filed: May 18, 2021

(65) Prior Publication Data
US 2021/0363942 A1   Nov. 25, 2021

(30) Foreign Application Priority Data

May 21, 2020   (JP) .............................. JP2020-088734

(51) Int. Cl.
*F02M 25/08*   (2006.01)
*G01M 3/28*   (2006.01)

(52) U.S. Cl.
CPC ...... *F02M 25/0809* (2013.01); *G01M 3/2815* (2013.01)

(58) Field of Classification Search
CPC ................................................ F02M 25/0809
See application file for complete search history.

(56) References Cited

U.S. PATENT DOCUMENTS

| 10,865,742 | B2 * | 12/2020 | Takagi | F02M 25/0809 |
|---|---|---|---|---|
| 2006/0016252 | A1 * | 1/2006 | Iriyama | F02M 25/0809 |
| | | | | 73/114.39 |
| 2010/0126476 | A1 * | 5/2010 | Hidano | F02M 37/0082 |
| | | | | 123/519 |
| 2014/0095049 | A1 * | 4/2014 | Jentz | F02M 65/00 |
| | | | | 701/101 |
| 2014/0318504 | A1 | 10/2014 | Pearce et al. | |
| 2017/0241376 | A1 * | 8/2017 | Dudar | F02M 25/0809 |
| 2018/0080415 | A1 | 3/2018 | Kishi et al. | |
| 2019/0017453 | A1 * | 1/2019 | Dudar | G06N 5/046 |
| 2020/0003164 | A1 * | 1/2020 | Choi | F02D 41/182 |
| 2020/0132023 | A1 | 4/2020 | Ishihara et al. | |

FOREIGN PATENT DOCUMENTS

| JP | 2004-156468 | 6/2004 |
|---|---|---|
| JP | 2007-092587 | 4/2007 |

* cited by examiner

*Primary Examiner* — Logan M Kraft
*Assistant Examiner* — Anthony L Bacon
(74) *Attorney, Agent, or Firm* — Nixon & Vanderhye P.C.

(57) ABSTRACT

A leak hole determination device in an evaporated fuel processing system. The leak hole determination device includes: a first pressure detector for detecting a first pressure in a fuel tank; a second pressure detector for detecting a second pressure in a canister; and a leak hole determiner for determining whether a leak hole is present. The leak hole determiner determines, after a limit pressure timing subsequent to a depressurization operation for depressurizing an inside of the system, whether a leak hole is present by using a difference between a change speed of a first pressure detected by the first pressure detector and a change speed of a second pressure detected by the second pressure detector.

14 Claims, 17 Drawing Sheets

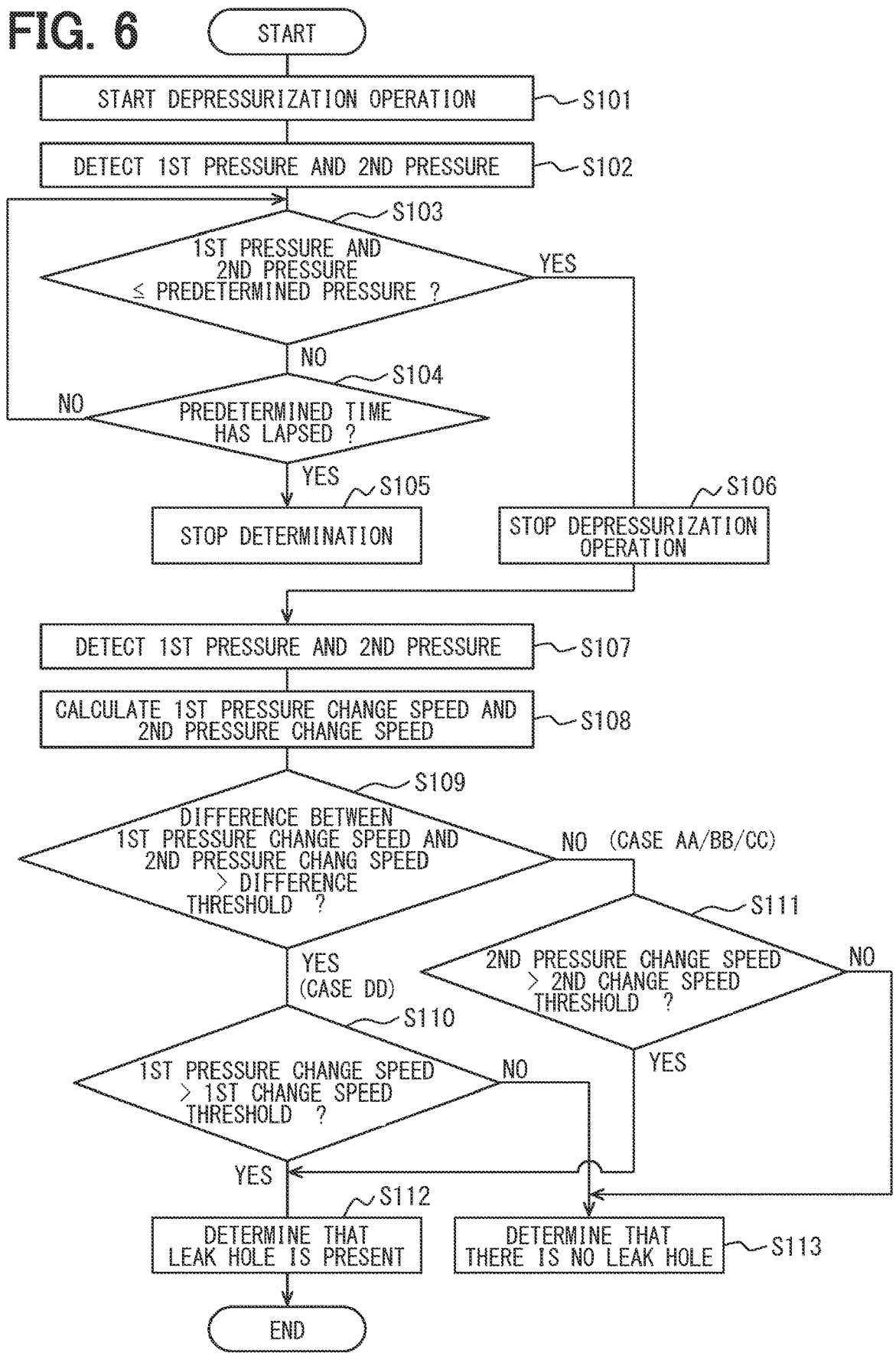

LEAK HOLE DETERMINATION DEVICE OF EVAPORATED FUEL PROCESSING DEVICE

CROSS REFERENCE TO RELATED APPLICATION

The present application is based on and claims the benefit of priority of Japanese Patent Application No. 2020-088734, filed on May 21, 2020, the disclosure of which is incorporated herein by reference.

TECHNICAL FIELD

The present disclosure generally relates to a leak hole determination device of an evaporated fuel processing device. For conciseness, the leak hole determination device will be referred to as "the device", and the evaporated fuel processing device will be referred to as "the evaporated fuel processing system" or simply as "the system".

BACKGROUND INFORMATION

In a vehicle having an internal-combustion engine, liquid hydrocarbon fuels such as gasoline, high octane gasoline, and light oil used in the internal-combustion engine are stored in a fuel tank. In the fuel tank, evaporated fuel is generated by the evaporation of the liquid fuel. In order not to release the evaporated fuel to the outside of the vehicle, an evaporated fuel processing device (the system) having a canister capable of absorbing the evaporated fuel is used. The term "absorbing" is used in a broad sense, and includes adsorbing.

In the system includes: a leak hole determination device (the device) for determining whether or not a leak hole causing leakage of the evaporated fuel is present; the fuel tank; and the canister. The device is also called an evaporated fuel leak inspection device because it inspects the possibility of leakage of evaporated fuel.

The device includes a pump capable of depressurizing the inside of the device. The degree of vacuum in the system is detected by the pressure sensor. Then, it is determined whether or not a leak hole is present depending on whether or not the required degree of vacuum has been achieved.

Further, in a "leak diagnosis device" (i.e., a leak hole determination device) of the "evaporated fuel processing system" (i.e., an evaporated fuel processing device) of Patent Document 1, a gas pressure detecting means is provided in a purge passage connecting the canister and an intake passage of the engine. The gas pressure detecting means detects the pressure change of a gas pressure within a set time set before the leak diagnosis. Then, based on a pressure change amount or a pressure change speed of the gas pressure, it is determined whether or not to allow the leak diagnosis as a diagnosis of determining the presence or absence of a leak hole. In such manner, it is detected whether or not vapor (i.e., an evaporated fuel) is generated before the leak diagnosis, and the leak diagnosis is performed when the vapor is not generated to prevent erroneous diagnosis.

SUMMARY

It is an object of the present disclosure to provide a leak hole determination device ("the device") that is capable of accurately determining whether there is a leak hole in an evaporated fuel processing device ("the system") even when a fuel component of the evaporated fuel remains in a canister (e.g., hydrocarbon fuel may be adsorbed by activated carbon in the canister). For conciseness, the term "wet canister" means that a significant amount of fuel is presently absorbed by the absorbent in the canister. The term "dry canister" means the opposite.

In one aspect of the present disclosure, the device determines presence or absence of a leak hole in the system. The system includes: the device, a fuel tank, and a canister for absorbing an evaporated fuel discharged from the fuel tank. The device includes:

a first pressure detector for detecting a pressure in the fuel tank;

a second pressure detector for detecting the pressure in the canister, or in a decompression pipe, or in a purge pipe; and a leak hole determiner (a controller) for determining whether a leak hole is present by using at least one of (A) a difference between a pressure change speed of the pressure detected by the first pressure detector and a pressure change speed of the pressure detected by the second pressure detector after a limit pressure timing or (B) a difference between the pressure detected by the first pressure detector and the pressure detected by the second pressure detector after the limit pressure timing, wherein the limit pressure timing is a timing at which the pressure detected by the first pressure detector and the pressure detected by the second pressure detector respectively take a limit pressure value due to a pressurization operation or a depressurization operation for pressurizing or depressurizing an inside of the device system. The leak hole determiner may include a processor (not shown) and a non-transitory computer storage medium.

The device, in one aspect of the present disclosure, enables detection of a leak hole in the system by using the first pressure detector for detecting a pressure in the fuel tank and the second pressure detector for detecting a pressure in the canister, even when the fuel component of the evaporated fuel remains in the canister. We define the canister as "wet" or "loaded" when the canister includes fuel absorbed by the absorbent. The pressure in the canister may be approximated by a pressure in a purge pipe or a pressure in a decompression pipe.

BRIEF DESCRIPTION OF THE DRAWINGS

Objects, features, and advantages of the present disclosure will become more apparent from the following detailed description made with reference to the accompanying drawings, in which:

FIG. 6 is a flowchart showing a determination method of the leak hole determination device according to the first embodiment;

DETAILED DESCRIPTION

A preferred embodiment of the leak hole determination device 5 ("the device") of the evaporated fuel processing device 1 ("the system") described above is described with reference to the drawings. The term "gas" is used to describe material in a gas phase or state, in contrast to material in a liquid phase or state. The canister is defined as "wet" when the absorbent has absorbed enough evaporated fuel to increase a pressure drop across the absorbent.

Figure 1:
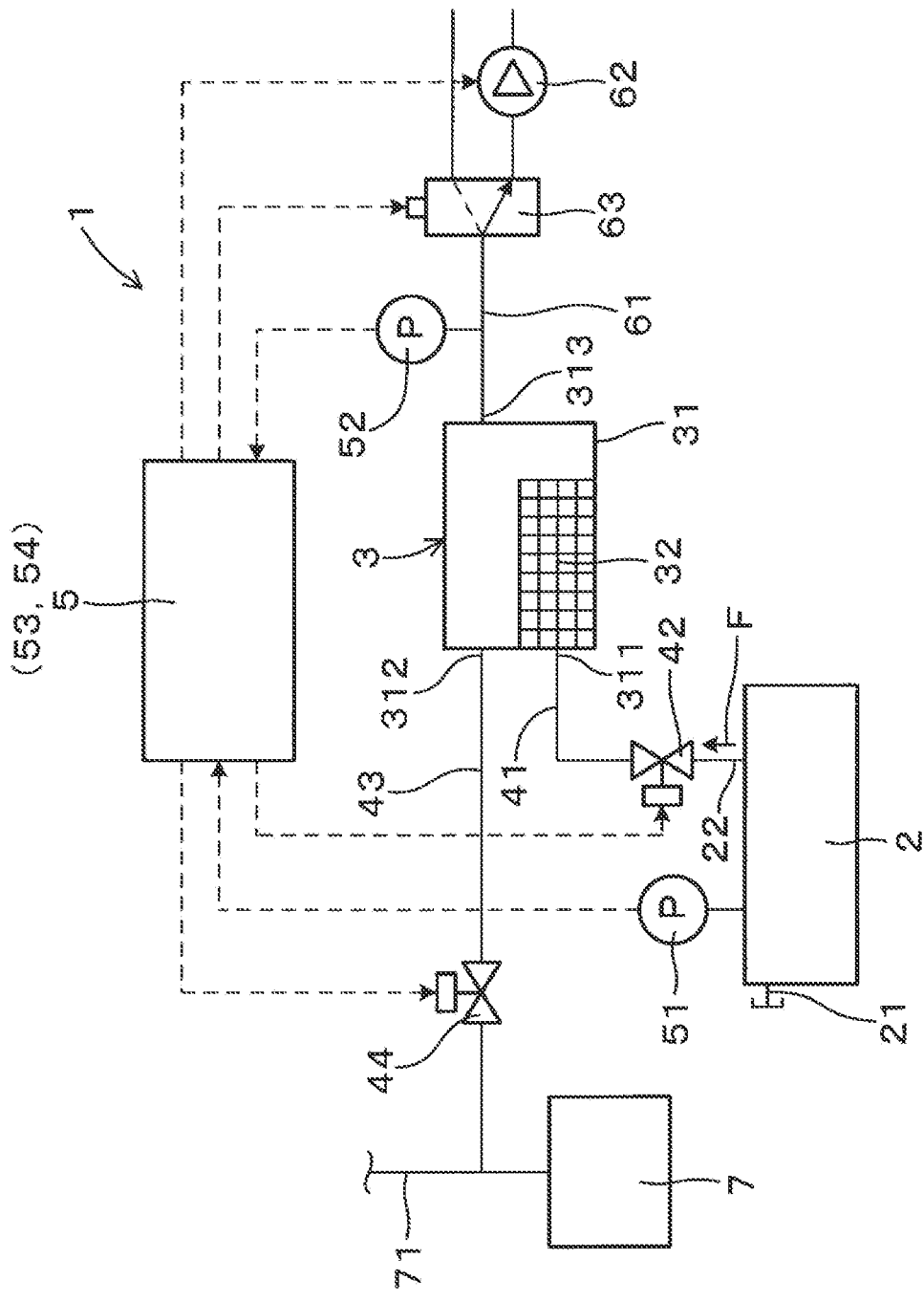
FIG. 1 is an explanatory diagram showing a configuration of an evaporated fuel processing device and a leak hole determination device according to a first embodiment.

First Embodiment, FIG. 1

As shown in FIG. 1, the system 1 includes: the device 5, a fuel tank 2, and a canister 3 for absorbing an evaporated fuel F discharged from the fuel tank 2. The device 5 determines the presence or absence of a leak hole X in the system 1. The leak hole X may be a physical hole, or may be a gas permeable portion.

Figure 5A:
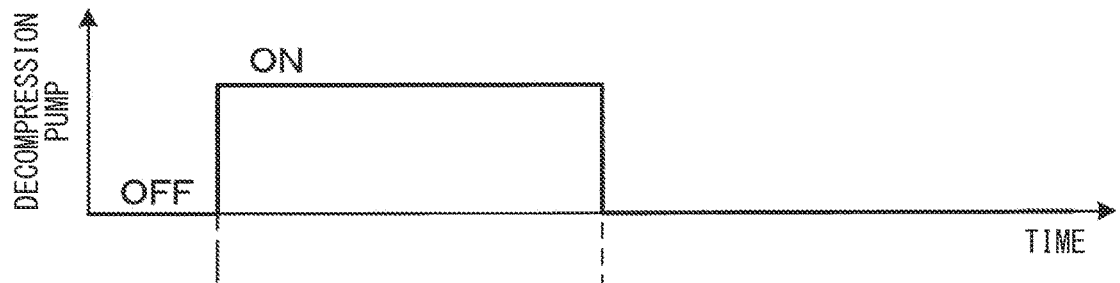
FIGS. 5A to 5C are respectively a graph showing (A) an operation of the decompression pump, (B) a pressure change detected by the first pressure detector, and (C) a pressure change detected by the second pressure detector according to the first embodiment.
Figure 5B:
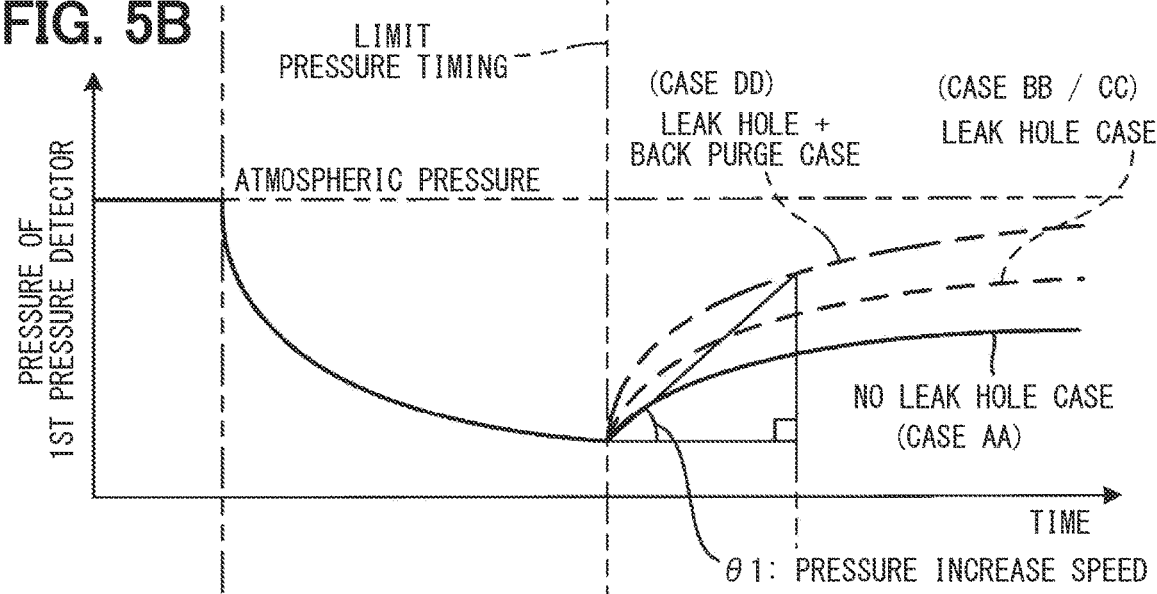

The device 5 includes a first pressure detector 51 for detecting a first pressure in the fuel tank 2, a second pressure detector 52 for detecting a second pressure in the canister 3, and a leak hole determiner (controller) 53 for determining the presence or absence of the leak hole X. The leak hole determiner 53 determines the presence or absence of the leak hole X by using a difference of two pressure change speeds, i.e., the change speed in pressure (a first repressurization rate) detected by the first pressure detector 51 and the change speed in pressure (a second repressurization rate) detected by the second pressure detector 52, immediately after a limit pressure timing, which is caused by a depressurization operation for depressurizing an inside of the system. Here, the limit pressure timing means a time when the depressurization operation stops. The limit pressure timing may be a first predetermined time of lapse from a start of decompression, for example, as shown in FIGS. 5A, 5B, and steps S105 and S106 of FIG. 6. The first pressure detected by the first pressure detector 51 and the second pressure detected by the second pressure detector 52 reach their minimum values at the limit pressure timing, when the depressurization operation stops. Note, in other embodiments a pressurization stage is followed by a depressurization state, see FIG. 11B.

The device 5 of the system 1 of the present embodiment is described in detail below. As shown in FIG. 1, the system 1 is used in a vehicle to prevent the evaporated fuel F constituting a gas phase fuel in the fuel tank 2 from being discharged to the atmosphere. The evaporated fuel F in the fuel tank 2 may be stored in the canister 3 and then discharged (through a purge pipe 43) to an intake pipe 71 of an engine 7, or (not shown in FIG. 1) bypasses the canister 3 and is discharged to the intake pipe 71 of the engine 7. Thus, the evaporated fuel F may be used for combustion in the engine 7.

The system 1 of the present embodiment can be applied to a hybrid vehicle including the engine 7 and an electric traveling motor (not shown). Further, the system 1 may be applied to various vehicles equipped with the engine 7.

The fuel tank 2 and the canister 3 are connected by a vapor pipe 41 for discharging the evaporated fuel (in a gas phase, or a vapor phase) F from the fuel tank 2 to the canister 3. A sealing valve 42 for sealing the fuel tank 2 is arranged in the vapor pipe 41. When the evaporated fuel F is discharged from the fuel tank 2 to the canister 3, and when a leak hole determination (leakage inspection) is performed, the vapor pipe 41 is opened by the sealing valve 42.

The canister 3 and the intake pipe 71 of the engine 7 are connected by a purge pipe 43 for discharging the fuel component from the canister 3 to the intake pipe 71 (optionally by simultaneously drawing atmosphere through the switching valve 63, the decompression pipe 61, and the canister 3). A purge valve 44 for opening and closing the purge pipe 43 is arranged in the purge pipe 43. When the fuel component is discharged from the canister 3 to the intake pipe 71, the purge pipe 43 is opened by the purge valve 44. When a leak hole determination (leakage inspection) is performed, the purge valve 44 closes the purge pipe 43, thus isolating the canister 3 from the intake pipe 71.

The purge pipe 43 may have a purge pump (not shown) for assisting the flow of the atmosphere containing the fuel component from the canister 3 to the intake pipe 71 and the flow of the evaporated fuel F from the fuel tank 2 to the intake pipe 71. Alternatively, a vacuum in the intake pipe of the engine may assist the flow.

A decompression pipe 61, in which a decompression pump 62 and a switching valve 63 to be described later are arranged (or are attached), is connected to the canister 3. A second pressure sensor constituting the second pressure detector 52 is arranged in the decompression pipe 61. The second pressure sensor may be called a canister pressure sensor, for convenience. The switching valve 63 may comprise two or more distinct valves arranged to provide a switching function and/or a complete sealed function. Specifically, the switching valve 63 may completely seal during a recompression phase, in order to isolate the decompression pump 62 away from a tested portion of the system 1.

When the evaporated fuel F is purged from the fuel tank 2 to the canister 3, or when the fuel component (including fuel absorbed by the absorbent 32) is purged from the canister 3 to the intake pipe 71, or when the evaporated fuel F is purged from the fuel tank 2 to the intake pipe 71 via the canister 3, the decompression pipe 61 is preferably opened to the atmosphere by the switching valve 63. On the other hand, when the leak hole determination (leakage inspection) is performed, a pressure reducing operation, or a depressurization operation, by the decompression pump 62 is performable after a switching operation of the switching valve 63. Similarly, a leakage inspection may be performed using a pressure increasing operation and a compression pump (not shown in FIG. 1, see FIG. 8).

The flow rate of a combustion air supplied from the intake pipe 71 to the engine 7 is adjusted by operating a throttle valve (not shown) arranged in the intake pipe 71. The engine 7 is provided with a fuel injection device (not shown) that injects the fuel F supplied from the fuel tank 2.

(Fuel Tank 2)

As shown in FIG. 1, the fuel tank 2 stores fuel such as liquid hydrocarbon fuel used for the combustion operation of the engine 7. In the fuel tank 2, a fuel filler port 21 used when fuel is refueled from the outside, a vapor port 22 to which the vapor pipe 41 is connected, and a fuel pump (not shown) used when supplying fuel to the fuel injection device of the engine 7 are provided. The fuel pump supplies the fuel in a liquid phase from the fuel tank 2 to the fuel injection device.

(Canister 3)

As shown in FIG. 1, the canister 3 has a canister case 31 and an absorbent 32 such as activated carbon which is arranged in the canister case 31 and absorbs a fuel component in the evaporated fuel (vaporized fuel) F. The canister case 31 of the canister 3 has, arranged thereon, a gas phase gas inlet 311 connected to the vapor pipe 41, a fuel component outlet 312 connected to the purge pipe 43, and a pressure relief port 313 that is connected to the switching valve 63 (and that can be switched to the atmosphere or switched to the decompression pump 62).

The absorbent 32 in the canister 3 of the present embodiment is arranged in the canister 3 adjacent to the inlet 311 of the canister case 31. Then, the evaporated fuel F that has flowed into the canister 3 from the vapor pipe 41 through the inlet 311 is absorbed as a fuel component by the absorbent 32. The absorbed fuel component is later de-absorbed and later flows out from the outlet 312 to the purge pipe 43.

When the evaporated fuel (gas phase fuel) F is discharged from the gas phase of the fuel tank 2 to the canister 3, the pressure release port 313 is opened to the atmosphere by the operation of the switching valve 63. Then, in the canister 3, the fuel component in the evaporated fuel F is absorbed by the absorbent 32, and the pressure in the canister 3 becomes equivalent to the atmospheric pressure.

Further, the fuel component absorbed by the absorbent 32 of the canister 3 is de-absorbed (released) and then passes through the purge pipe 43 and is discharged to the intake pipe 71 of the engine 7 during operation of the engine 7. During the discharge, the pressure relief port 313 of the canister 3 is opened to the atmosphere by the switching valve 63, and the purge pipe 43 is opened by the purge valve 44. Then, the fuel component absorbed by the absorbent 32 is discharged into the intake pipe 71 of the engine 7 by the air flow using the differential pressure between the atmospheric pressure entering the canister 3 from the pressure relief port 313 and a negative pressure generated in the intake pipe 71.

When refueling the fuel tank 2, the evaporated fuel F in the fuel tank 2 flows to the canister 3 (because the evaporated fuel F is displaced by new liquid fuel added to the fuel tank 2). Further, even when the pressure in the fuel tank 2 rises to a predetermined value or more during the combustion operation of the engine 7, the evaporated fuel F in the fuel tank 2 is taken out to the intake pipe 71 via the canister 3. When the presence or absence of the leak hole X is determined by the device 5, it is considered that there is almost no fuel component of the evaporated fuel F absorbed by the absorbent 32 of the canister 3.

Figure 2:
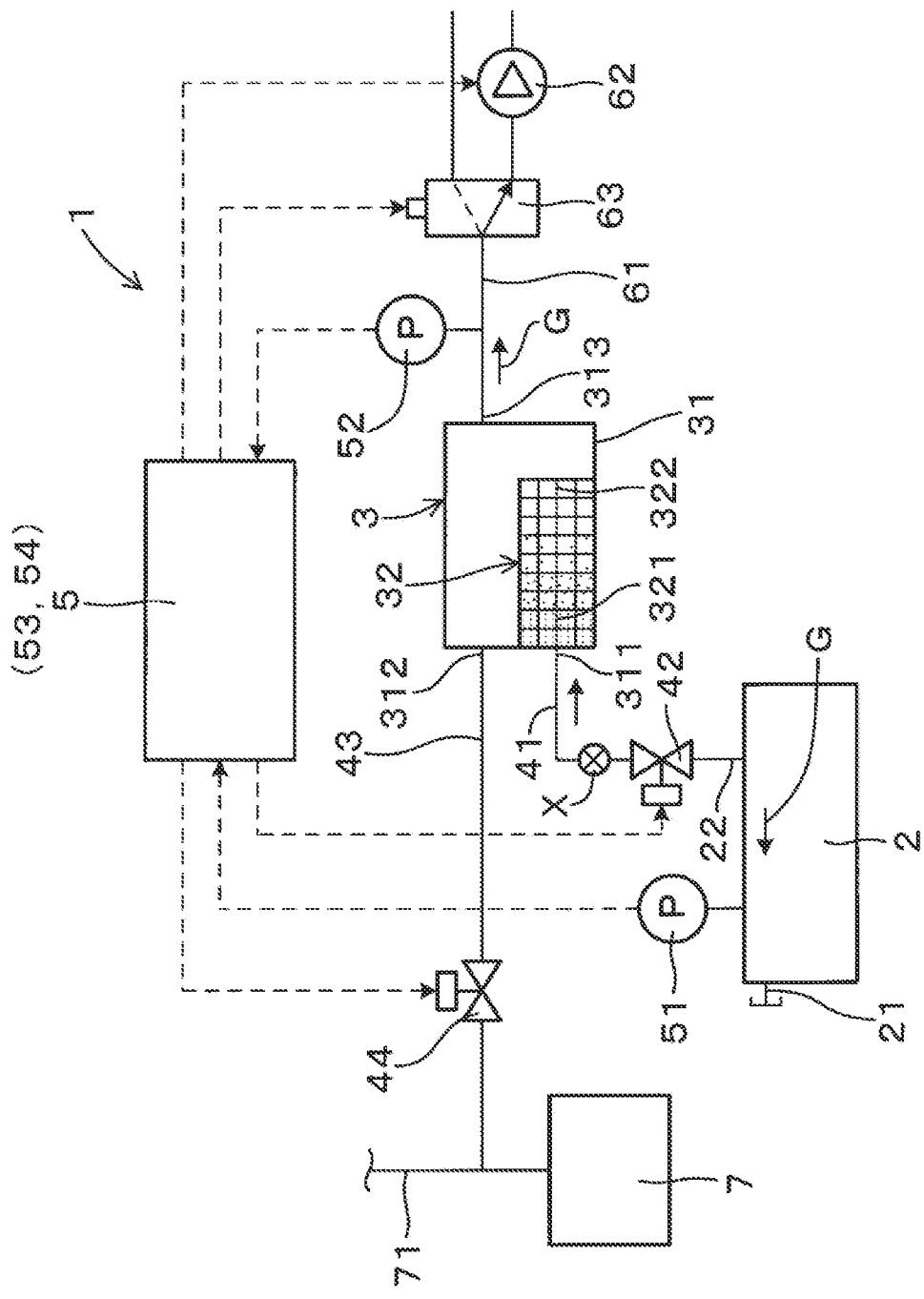
FIG. 2 is an explanatory diagram showing a gas flow after a depressurization operation in the device system of the evaporated fuel processing device when a leak hole is present in a vapor pipe according to the first embodiment.
Figure 3:
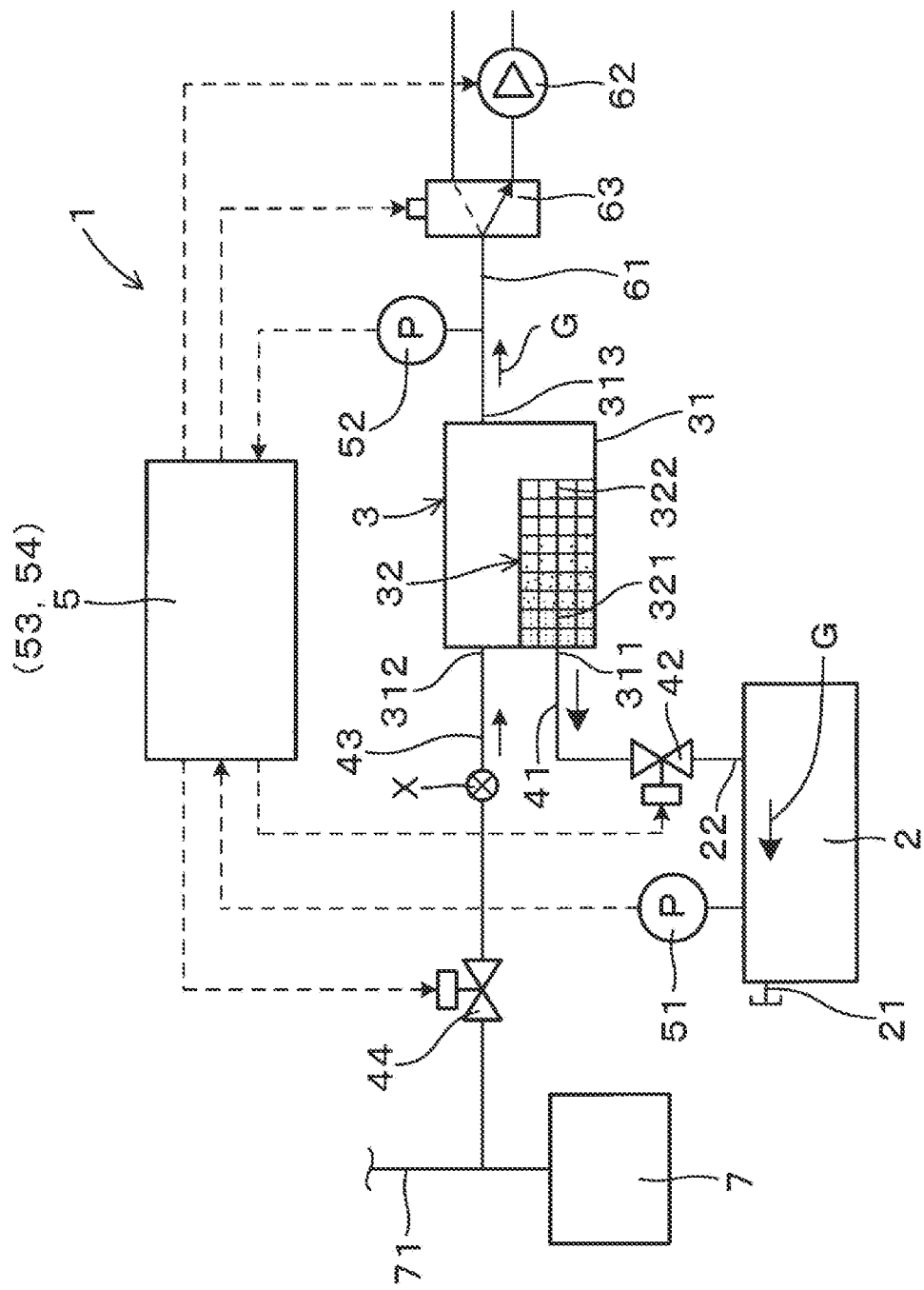
FIG. 3 is an explanatory diagram showing a gas flow after a depressurization operation in the device system of the evaporated fuel processing device when a leak hole is present in a purge pipe according to the first embodiment.

On the other hand, as shown in FIGS. 2 and 3, in a hybrid vehicle or the like, after traveling by a traveling (electric) motor and after the operation of the engine 7 is temporarily stopped, the fuel component of the evaporated fuel F remaining in the canister 3 may not be completely purged into the intake pipe 71 of the engine 7, and the fuel component may remain in the absorbent 32 of the canister 3. It is considered that the fuel component absorbed by the absorbent 32 of the canister 3 has a higher absorption concentration in a portion 321 (also known as a near portion) of the absorbent 32 closer to the fuel tank 2. Then, the fuel component may be present in a near part of the portion 321 (also known as a far portion) of the absorbent 32 closer to the fuel tank 2, while the fuel component may not be present in the far portion 322 of the absorbent 32 that is farther from the fuel tank 2 than the near portion 321.

(Leak Hole Determination Device 5, "the Device")

As shown in FIG. 1, the device 5 (also called as an evaporated fuel leak inspection device) serves as a decompression leak check module (ELCM) attached to the system 1. The system 1 includes: the device 5, the fuel tank 2, and the canister 3.

The device 5 includes: the first pressure detector 51, the second pressure detector 52, the leak hole determiner 53, and the control unit 54. The leak hole determiner 53 and the control unit 54 may be combined, may be defined as an electronic control unit, and may include: a controller with a processor and with a non-transitory computer-readable storage medium.

The sealing valve 42, the purge valve 44, and the like in the system 1 are controlled to open and close by the device.

The first pressure detector 51 of the present embodiment is configured by using a first pressure sensor that detects the pressure in the fuel tank 2. The first pressure sensor may be arranged in a pipe connected to the fuel tank 2, and the pressure in the fuel tank 2 may be detected via the pipe. Further, the second pressure detector 52 of the present embodiment is configured by using a second pressure sensor that detects the pressure in the canister 3. The second pressure sensor may be arranged in a pipe such as the decompression pipe 61 connected to the canister 3, and the pressure in the canister 3 may be detected via the pipe.

The device 5 may include the decompression pump 62 (for performing a depressurization operation for depressurizing the inside of the system including the inside of the fuel tank 2 and the inside of the canister 3), and the switching valve 63 (capable of switching between opening the inside of the canister 3 to the atmosphere and depressurization by the decompression pump 62). The operation of the decompression pump 62 and the opening/closing operation of the switching valve 63 are controlled by the control unit 54.

The decompression pump 62 is also called as a vacuum pump, which can create vacuum in the system 1 (i.e., inside of each of the fuel tank 2, the canister 3, the vapor pipe 41, the purge pipe 43, and the decompression pipe 61). When vacuum creation is performed by the decompression pump 62, the purge pipe 43 is closed by the purge valve 44, and the canister 3 is sealed from the atmosphere by the switching valve 63.

The switching valve 63 is composed of a solenoid valve. The switching valve 63 can be switched between an open position (with the inside of the canister 3 opened to the atmosphere) and a depressurization position (with the inside of the canister 3 connected to the decompression pump 62). When the switching valve 63 is switched from the open position to the depressurization position, the decompression pump 62 enables vacuum creation in the device system. The switching valve 63 may also include a fully closed position, in which the canister 3 is closed to the atmosphere and is simultaneously closed to the decompression pump 62

In the determination of the presence or absence of the leak hole X by the leak hole determiner 53 of the device 5, if the leak hole X in the device system is estimated to be equal to or greater than a predetermined size, it is determined that the leak hole X is present. Then, when the leak hole X is equal to or greater than a predetermined size, it is determined that there is a leak hole X by using the fact that the rate of increase in pressure (i.e., a pressure change/increase speed) after decompression in the device system increases. However, even when the leak hole X is small and does not exceed a predetermined size, if the fuel component remains in the absorbent 32 of the canister 3 and the leak hole X exists at a specific position, due to the influence of the fuel component remaining on or in the absorbent 32, the rate of increase in pressure in the device system after decompression may increase as if the leak hole X has a predetermined size or larger. In the present embodiment, a phenomenon in which the pressure increase speed increases (in which the recompression rate increases) due to the fuel component is called "back purge". In back purge, the fuel in the absorbent 32 is "back" purged into the atmosphere via the decompression pump 62, in contrast to being purged (normal purged, or forward purged) through the purge pipe 43 into the intake pipe 71.

In the present embodiment, the presence or absence of back purge is determined by detecting the pressure increase speed of the fuel tank 2 and the pressure increase speed of the purge pipe 43 or the decompression pipe 61, and comparing those pressure increase speeds. Then, in consideration of the influence of the back purge, or after deducting such influence of back purge from the observation, it is determined that the leak hole X exists when it is estimated that the leak hole X has a predetermined size or larger. The allowable size of the leak hole X can be, for example, less than φ 0.5 mm.

Figure 4:
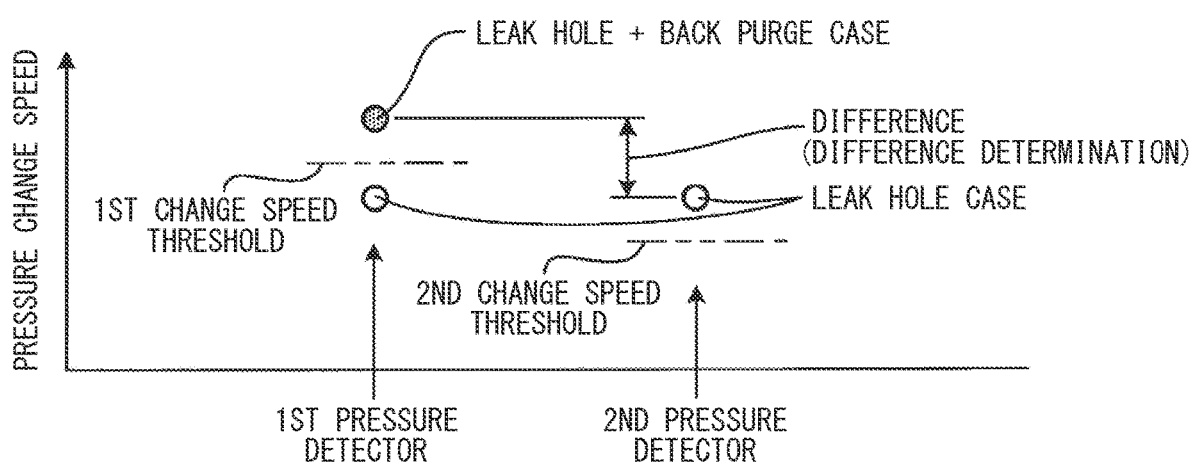
FIG. 4 is a graph showing a pressure change speed detected by a first pressure detector and a pressure change speed detected by a second pressure detector according to the first embodiment.

(Leak Hole Determiner 53, FIGS. 4, 5, 6)

As shown in FIG. 4, the leak hole determiner 53 of the present embodiment is configured to determine the presence or absence of the leak hole X by combining a plurality of determinations. See FIG. 6 for an illustrative logic flowchart. Specifically, the leak hole determiner 53 determines the presence or absence of the leak hole X by a combination of (i) a difference determination, (ii) a first change speed determination, and (iii) a second change speed determination. In the difference determination (i), it is determined whether an absolute value of the difference between the pressure change speed detected by the first pressure detector 51 after the limit pressure (i.e., at or after the limit pressure timing) and the pressure change speed detected by the second pressure detector 52 after the limit pressure (i.e., at or after the limit pressure timing) exceeds a predetermined difference threshold value. (Note, in FIG. 6 the determination is stopped (S105) if a first predetermined time has lapsed.)

The first change speed determination (ii) determines whether or not the pressure change speed (detected by the first pressure detector 51 after the limit pressure) exceeds a predetermined first change speed threshold value. The second change speed determination determines whether or not the pressure change speed detected by the second pressure detector 52 (after the limit pressure) exceeds the predetermined second change speed threshold value. See FIG. 6 and the related discussion for logic details.

The limit pressure (minimum measured pressure) in the present embodiment means a lower limit pressure when the pressure drops after the depressurization operation is performed by the decompression pump 62. Further, the limit pressure of the present embodiment is a pressure at an operation stop timing of the decompression pump 62 after the operation of the decompression pump 62 is started. By the operation of the decompression pump 62, the limit pressure required for the leak hole determination is realizable, or, in other words, an occasion for determining the presence or absence of a leak hole is quickly providable by bringing/causing the limit pressure in the device system.

The leak hole determiner 53 obtains, i.e., calculates, the pressure change speed detected by the first pressure detector 51 based on the amount of change in pressure detected by the first pressure detector 51 during a second predetermined time after the limit pressure timing. In the present embodiment, the pressure change speed detected by the first pressure detector 51 is obtained based on the amount of change in pressure detected by the first pressure detector 51 from the limit pressure timing to the time when the second predetermined time elapses therefrom. See S108 in FIG. 6.

Further, the leak hole determiner 53 obtains, i.e., calculates, the pressure change speed detected by the second pressure detector 52 based on the amount of change in pressure detected by the second pressure detector 52 within the second predetermined time after the limit pressure timing. In the present embodiment, the pressure change speed detected by the second pressure detector 52 is determined based on the amount of change in pressure detected by the second pressure detector 52 from the limit pressure timing to the time when the second predetermined time elapses therefrom. See S108 in FIG. 6.

The leak hole determiner 53 may obtain the pressure change speed detected by the first pressure detector 51 based on a time derivative value of the pressure detected by the first pressure detector 51 after the limit pressure timing. Further, the leak hole determiner 53 may obtain the pressure change speed detected by the second pressure detector 52 based on a time derivative value of the pressure detected by the second pressure detector 52 after the limit pressure timing. The time derivative value of the pressure is obtained as a difference of the pressure changed within the second predetermined time.

The difference determination is a determination which uses a phenomenon that, depending on the position of the leak hole X in the device system and due to the influence of the fuel component absorbed by the absorbent 32 of the canister 3 (i.e., the influence of a wet canister), the pressure change speed detected by the first pressure detector 51 and the pressure change speed of the second pressure detector 52 become different from each other. That is, in a case where a leak hole X is generated in the vapor pipe 41 or the fuel tank 2 as a position on the fuel tank 2 side with respect to the canister 3 as shown in FIG. 2 (in other words, the leak hole X is in a "fuel-tank side" of the canister 3), and, in a case where a leak hole X is present in the purge pipe 43 (as shown in FIG. 3) or the decompression pipe 61, the pressure change speed detected by the first pressure detector 51 is different.

(When the Absorbent 32 has No Fuel Component, "Dry Canister")

In a state where the fuel component is hardly absorbed by the absorbent 32 of the canister 3, no matter where the leak hole X is formed in the device system, there is no significant difference between the pressure change speed detected by the first pressure detector 51 after the limit pressure and the pressure change speed detected by the second pressure detector 52 after the limit pressure. In such state, the fuel component in the absorbent 32 of the canister 3 does not generate vapor pressure.

(Case AA: When No Leak Hole X in the System, FIGS. 5B and 5C Dark Lines)

Figure 5C:
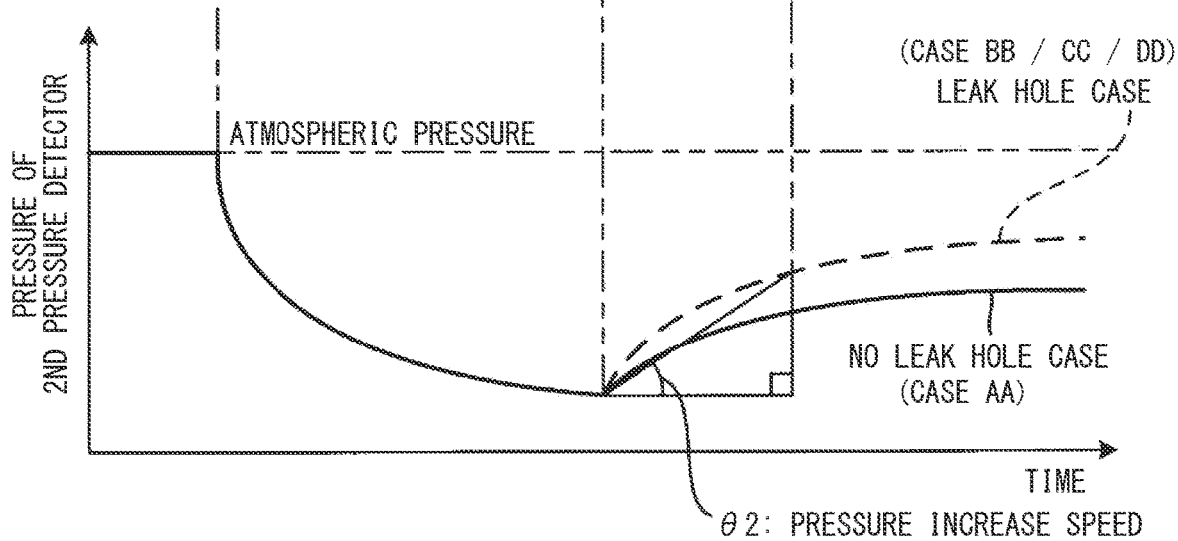

When there is no leak hole X in the system, as shown by solid lines in FIGS. 5B and 5C, there is not much difference between the pressure increase speed detected by the first pressure detector 51 after the limit pressure and the pressure increase speed detected by the second pressure detector 52 after the limit pressure. That is, both of the two pressure increase speeds have a gentle slope.

(Case BB: When Leak Hole X and Dry Canister, FIGS. 5A and 5C Dashed Lines)

If there is a leak hole X in any part of the device systems, the pressure increase speed detected by the pressure detectors 51 and 52 after the limit pressure, as shown by broken lines in FIGS. 5B and 5C, has a steeper slope than when there is no leak hole X. However, even in such case, there is not much difference between the pressure increase speed detected by the first pressure detector 51 after the limit pressure and the pressure increase speed detected by the second pressure detector 52 after the limit pressure.

(Case CC: When Wet Canister and Leak Hole X is Present in the Fuel-Tank Side)

As shown in FIG. 2, when a leak hole X is present in the fuel-tank side (in the vapor pipe 41 or the fuel tank 2) in a wet canister state (in a state where the fuel component is absorbed by the absorbent 32 of the canister 3), atmosphere flows into the system from the leak hole X after the depressurization operation is performed. During such time (during recompression), the fuel component absorbed in a near portion 321 (of the absorbent 32 on one side closer to the fuel tank 2) moves to a far portion 322 (of the absorbent 32 on the other side farther from the fuel tank 2) together with the flow of the gas G, which in turn causes the flow of the gas G from the fuel tank 2 side (inlet 311 side) to the intake pipe 71 side (outlet 312 side) and also to the decompression pump 62 side (pressure release port 313 side). Then, not only the pressure on the fuel tank 2 side rises, but also the pressure on the intake pipe 71 side and the decompression pump 62 side rises. In other words, the leak hole X (located on the fuel-tank side) leaks in one direction through the valve pipe to the fuel tank (and toward the first pressure detector 51). The leak hole X also leaks in an opposite direction through the valve pipe to the wet canister, then through the wet canister to the non-fuel-tank side of the canister. The non-fuel-tank side includes both of: the decompression pipe 61 (with the second pressure detector 52), and the purge pipe 43.

As a result, as shown by the broken lines in FIGS. 5B and 5C, the pressure increase speed detected by the first pressure detector 51 after the limit pressure and the pressure increase speed detected by the second pressure detector 52 after the limit pressure have not much difference. Then, the absolute value of the pressure difference between the two pressure detectors 51 and 52 after the limit pressure becomes small, and the absolute value of such difference becomes equal to or less than the difference threshold value.

Note that the fuel-tank side means a side where the vapor pipe 41 and the fuel tank 2 are located with respect to the canister 3. Further, the intake-pipe side means a side where the intake pipe 71 is located with respect to the canister 3, and the decompression-pump side is a side where the decompression pump 62 and the decompression pipe 61 are located with respect to the canister 3.

(Case DD: When Wet Canister and a Leak Hole X is Present in the Non-Fuel-Tank Side, in Other Words in the Purge Pipe 43 or the Decompression Pipe 61)

As shown in FIG. 3, when a leak hole X is present in the purge pipe 43 and the canister is wet, after the depressurization operation is performed, atmosphere flows into the device system from the leak hole X. During such time, in the device system, the fuel component absorbed in the near portion 321 (of the absorbent 32 on one side closer to the fuel tank 2) flows outside the absorbent 32, out into the vapor pipe 41 together with the flow of the gas G. Further, the gas G flows from the purge-pipe 43 side (outlet 312 side) and the decompression-pump side (pressure release port 313 side) to the fuel-tank side (inlet 311 side). Then, due to the increase in pressure as back purging which is caused by the gas G and the vapor pressure of the fuel component, the pressure on the fuel-tank side is more likely to increase than the pressure in the non-fuel-tank side (in the purge-pipe side and/or in the decompression-pump side).

As a result, as shown by a two dot chain line (two small dashes followed by one long dash, then repeat) in FIG. 5B and a broken line in FIG. 5C, the pressure increase speed detected by the first pressure detector 51 after the limit pressure becomes greater/steeper than the pressure increase speed detected by the second pressure detector 52. Then, the absolute value of the pressure difference between the two pressure detectors 51 and 52 after the limit pressure becomes large, and the absolute value of such difference exceeds the difference threshold value. In this case (recompression after decompression), the pressure increase speed (recompression rate) of the first pressure detector (in the fuel-tank side) is greater than the pressure increase speed of the second pressure detector (recompression rate) of the non-fuel-tank side. Thus, in this case the difference is positive, and taking the absolute value of the difference has no effect.

In other words, when the difference is large (S109—YES in FIG. 6), this is case DD wet canister and leak hole X in non-fuel-tank side. However, we must test S110 to determine if the leak hole is substantial (S110—YES).

However, if the difference is small (S109—NO), then we know that we are not in case DD. If S109—NO, then all three other cases remain possible, and these possibilities are: case AA (no leak); case BB (dry canister and leak at unknown location); and case CC (wet canister and leak at fuel-tank side). In these cases we must test S111 to determine whether the leak (of case BB and CC) is substantial (S111—YES).

Thus, S109—YES definitely indicates that the leak hole X is in the non-fuel-tank side. But S109—NO does not definitely indicate a location of the leak hole, because case BB indicates a dry canister AND a leak at an unknown location.

In such manner, when the difference determination is performed after the depressurization operation is performed in the device system, whether a leak hole X of a predetermined size or more is present in the intake pipe 71 or the decompression pipe 61 is determinable by determining the difference in the pressure increase speeds detected by the two pressure detectors 51 and 52 after the limit pressure. In other words, when the fuel component is absorbed by the absorbent 32 of the canister 3, and the intake pipe 71 or the decompression pipe 61 has a leak hole X of a predetermined size or more, the absolute value of the pressure difference between the two pressure detectors 51 and 52 may exceed the predetermined difference threshold value.

The leak hole determiner 53 also has a function of estimating the position of the leak hole X in the device system of the evaporated fuel processing device 1 by using the difference in the pressure change speeds of the two pressure detectors 51 and 52 after the limit pressure. When such difference becomes large, it is estimated that a leak hole X of a predetermined size or more is present in the intake pipe 71 or the decompression pipe 61 in the device system. Then, when the absolute value of the difference exceeds the predetermined difference threshold value, the leak hole determiner 53 can estimate that a leak hole X of a predetermined size or more is present in the intake pipe 71 or the decompression pipe 61. In such manner, the leak hole determiner 53 may be able to estimate, in some cases, that the leak hole X is present on the intake pipe 71 side or the decompression pump 62 side in the device system. The predetermined difference threshold value is set to a value that is greater than an error range of the difference in the pressure change speed detected by the two pressure detectors 51 and 52, and greater than a range of the effect of pressure loss at a position between arrangement positions of the two pressure detectors 51 and 52. The difference threshold value is set as a difference between the pressure increase speeds of the two pressure detectors 51 and 52 in a situation when the amount of the fuel component remaining in the absorbent 32 of the canister 3 is a predetermined amount (the canister is wet).

The predetermined first change speed threshold value is set as a value detected as the pressure change speed detected by the first pressure detector 51 when a leak hole X having an upper limit size allowed in the device system is present. The predetermined second change speed threshold value is set as a value detected as the pressure change speed detected by the second pressure detector 52 when a leak hole X having an upper limit size allowed in the device system is present.

The leak hole determiner 53 of the present embodiment is configured to switch two determination schemes, that is, a scheme A that uses one of the first change speed determination and the second change speed determination and a scheme B that uses both of the first and second change speed determinations, depending on whether an absolute value of the difference in the difference determination exceeds the predetermined difference threshold value or not. With such configuration, it is possible to improve the accuracy of determining the presence or absence of the leak hole X by the leak hole determination device 5 in consideration of a unique pressure change state that is caused when the fuel component is absorbed by the absorbent 32 of the canister 3.

When the leak hole determiner 53 of the present embodiment determines by the difference determination that the absolute value of the difference between the pressure change speeds of the two pressure detectors 51 and 52 after the limit pressure does not exceed the predetermined difference threshold value, upon detecting at least one of the following two determinations, the leak hole determiner 53 determines that a leak hole X is present in the device system. That is, when, as the first change speed determination, the pressure change speed detected by the first pressure detector 51 after the limit pressure exceeds the predetermined first change speed threshold value, and/or when, as the second change speed determination, the pressure change speed detected by the second pressure detector 52 after the limit pressure exceeds the predetermined second change speed threshold value, it is determined that a leak hole X is present in the device system.

Further, when the leak hole determiner 53 of the present embodiment determines by the difference determination that the absolute value of the difference between the pressure change speeds of the two pressure detectors 51 and 52 after the limit pressure exceeds the predetermined difference threshold value, the leak hole determiner 53 determines that a leak hole X is present in the device system when a change speed determination of one of the two pressure detectors 51 or 52 having a greater pressure change speed, which detects that the pressure change speed exceeds the predetermined change speed threshold value. More specifically, in the leak hole determiner 53 of the present embodiment, when the absolute value of the difference in the pressure change speed by the two pressure detectors 51 and 52 after the limit pressure is determined as exceeding the predetermined difference threshold value by the difference determination, it is determined that the device system has a leak hole X when the first pressure change speed determination detects that the pressure change speed detected by the first pressure detector 51 exceeds the predetermined first change speed threshold value.

(Pressure Change in Fuel Tank 2 and Canister 3)

FIG. 5A is a graph showing the start and stop timings of depressurization by the decompression pump 62. After a depressurization operation by the decompression pump 62 is stopped, the pressure change speed detected by the first pressure detector 51 and the pressure change speed detected by the second pressure detector 52 are calculated, respectively.

FIG. 5B is a graph showing a change in pressure (referred to as a first pressure) detected by the first pressure detector 51 when a depressurization operation is performed by the decompression pump 62. When no leak hole X is present at any position in the device system, the atmosphere does not flow into the device system from the leak hole X, and the increase speed of the first pressure after the limit pressure timing at which the depressurization operation is stopped lowers, as shown by the solid line in FIG. 5B.

On the other hand, when a leak hole X is present in the device system but the fuel component is not absorbed by the absorbent 32 of the canister 3, the atmosphere flowing into the device system from the leak hole X increases the increase speed of the first pressure from the limit pressure timing at which the depressurization operation is stopped. Further, when a leak hole X is present on the intake pipe 71 side or the decompression pump 62 side in the device system and the fuel component is absorbed by the absorbent 32 of the canister 3, under the influence of the atmosphere flowing into the device system from the leak hole X and the fuel component flowing out of the absorbent 32 as a back purge, the increase speed of the first pressure after the limit pressure timing at which the depressurization operation is stopped further increases as shown by the two-point chain line in FIG. 5B.

FIG. 5C is a graph showing a change in pressure (referred to as a second pressure) detected by the second pressure detector 52 when the depressurization operation is performed by the decompression pump 62. When no leak hole X is present at any position in the device system, the atmosphere does not flow into the device system from the leak hole X, and, as shown by the solid line in FIG. 5C, the increase speed of the second pressure after the limit pressure timing at which the depressurization operation is stopped lowers.

On the other hand, when a leak hole X is present at any position in the device system, the increase speed of the second pressure increases from the limit pressure timing at which the depressurization operation is stopped as shown by the broken line in FIG. 5C, due to the atmosphere flowing into the device system from the leak hole X. During such time, even when the fuel component is absorbed by the absorbent 32 of the canister 3, the increase speed of the second pressure is the same as the broken line in FIG. 5C.

FIG. 5B shows the first pressure when a leak hole X is present on the intake pipe 71 side or the decompression pump 62 side in the device system and the fuel component is absorbed by the absorbent 32 of the canister 3, i.e., an increase speed of the first pressure is indicated by an inclination angle 81. Further, FIG. 5C shows the second pressure when a leak hole X is present on the intake pipe 71 side or the decompression pump 62 side in the device system and the fuel component is absorbed by the absorbent 32 of the canister 3 i.e., an increase speed of the second pressure is indicated by an inclination angle 82. It can be seen in FIGS. 5B and 5C that the inclination angle 81 indicating the increase speed of the first pressure is equal to or greater than the inclination angle 82 indicating the increase speed of the second pressure, and the difference between the increase speed of the first pressure and the increase speed of the second pressure becomes large.

(Determination Method)

Next, a method of determining the presence or absence of the leak hole X by the leak hole determination device 5 is described with reference to the flowchart of FIG. 6. When determining the presence or absence of the leak hole X, the control unit 54 of the leak hole determination device 5 opens the vapor pipe 41 by opening the sealing valve 42 and closes the purge pipe 43 by closing the purge valve 44. Further, the control unit 54 sets the switching valve 63 to a depressurization position, operates the decompression pump 62, and depressurizes the inside of the device system including the fuel tank 2 and the canister 3 by the decompression pump 62 as a depressurization operation (FIG. 6, Step S101).

Next, the leak hole determiner 53 detects the pressure in the fuel tank 2 by the first pressure detector 51, and detects the pressure in the canister 3 by the second pressure detector 52 (Step S102). Then, the leak hole determiner 53 determines whether or not the pressure (referred to as the first pressure) detected by the first pressure detector 51 is equal to or lower than the predetermined pressure, and determines whether or not the pressure (referred to as the second pressure) detected by the second pressure detector 52 is equal to or lower than the predetermined pressure (Step S103). If at least one of the first pressure and the second pressure does not fall below the predetermined pressure even after the depressurization operation is performed for a predetermined time (Step S104), the leak hole determiner 53 stops the leak hole determination of whether a leak hole is present, determining that (a) a large leak hole X is present in the device system, or (b) the decompression pump 62 or the like has a failure (Step S105).

On the other hand, when both of the first pressure and the second pressure become equal to or lower than the predetermined pressure, the control unit 54 stops the depressurization operation by the decompression pump 62 (Step S106). Then, the leak hole determiner 53 detects the first pressure and the second pressure within a predetermined time from the limit pressure timing at which the depressurization operation is stopped (Step S107).

Next, the leak hole determiner 53 calculates the change speed of the first pressure within a predetermined time from the limit pressure timing, and also calculates the change speed of the second pressure within the predetermined time from the limit pressure timing (Step S108). Then, as a difference determination, the leak hole determiner 53 determines whether or not the absolute value of the difference between the change speed of the first pressure and the change speed of the second pressure exceeds the predetermined difference threshold value (Step S109).

When the absolute value of the difference exceeds the predetermined difference threshold value, the leak hole determiner 53 can estimate that, (i) due to a leak hole X present in the intake pipe 71 and the decompression pipe 61 and (ii) because the fuel component absorbed by the absorbent 32 of the canister 3 is flowing out therefrom, the change speed of the first pressure is equal to or greater than the change speed of the second pressure. Then, as the first change speed determination, the leak hole determiner 53 determines whether or not the change speed of the first pressure exceeds the predetermined first change speed threshold value (Step S110).

When the change speed of the first pressure exceeds the predetermined first change speed threshold value, the leak hole determiner 53 can determine that the intake pipe 71 or the decompression pipe 61 has a leak hole X of a predetermined size or more (Step S112). The first change speed threshold value can be set to a value equal to or greater than usual in consideration of the influence of the fuel component flowing out of the absorbent 32 increasing the first pressure. In other words, as shown in FIG. 4, the first change speed threshold value can be set to a value equal to or greater than the second change speed threshold value. In such manner, the presence or absence of the leak hole X can be determined in consideration of the fact that the fuel component is absorbed by the absorbent 32. On the other hand, when the change speed of the first pressure is equal to or less than the predetermined first change speed threshold value, the leak hole determiner 53 can determine that no leak hole X of a predetermined size or more is present in the device system (Step S113).

In step S109, when the absolute value of the difference is equal to or less than the predetermined difference threshold value, the leak hole determiner 53 determines whether the change speed of the second pressure exceeds the predetermined second change speed threshold value or not as the second change speed determination (Step S111). When the change speed of the second pressure exceeds the predetermined second change speed threshold value, the leak hole determiner 53 can determine that a leak hole X of a predetermined size or more is present at any position in the device system (Step S112). The second change speed threshold value can be set to a normal/usual value regardless of whether or not the fuel component is absorbed by the absorbent 32. On the other hand, when the change speed of the second pressure is equal to or less than the predetermined second change speed threshold value, the leak hole determiner 53 can determine that no leak hole X of a predetermined size or more is present in the device system (Step S113).

(Effects)

The leak hole determination device 5 of the evaporated fuel processing device 1 of the present embodiment has the first pressure detector 51 for detecting the pressure in the fuel tank 2 and the second pressure detector 51 for detecting the pressure in the canister 3. By using the two pressure detectors 51 and 52, even when the fuel component of the evaporated fuel F remains in the canister 3, a determination of whether the leak hole X is present in the device system of the evaporated fuel processing device 1 is enabled.

The leak hole determination device 5 uses the difference of the pressure change speeds of the two pressure detectors 51 and 52 to detect whether a unique pressure change phenomenon particular to the case where the fuel component of the evaporated fuel F remains in the canister 3 is present. Specifically, when the fuel component of the evaporated fuel F remains in the canister 3 and the leak hole X is present in the intake pipe 71 or the decompression pipe 61 in the device system, a difference of the two pressure change speeds derived from the two pressure detectors 51 and 52 may become large. Then, by using such phenomenon that the difference becomes large for determining the presence or absence of the leak hole X, the accuracy of the determination of the presence or absence of the leak hole X can be improved.

Therefore, according to the leak hole determination device 5 of the evaporated fuel processing device 1 of the present embodiment, even when the fuel component of the evaporated fuel F remains in the canister 3, the presence or absence of the leak hole X can be accurately determined.

Figure 7:
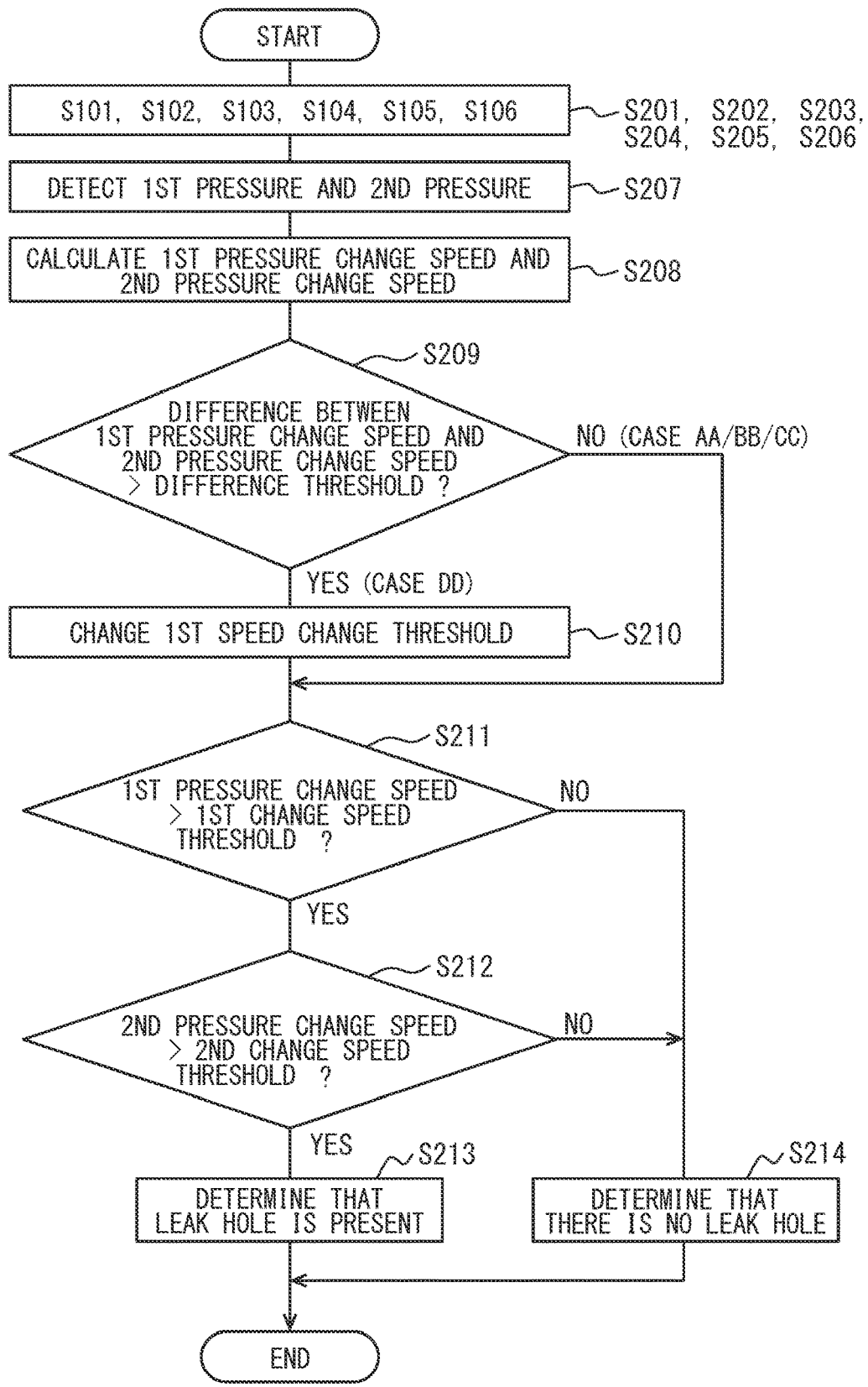
FIG. 7 is a flowchart showing a determination method of the leak hole determination device according to a second embodiment.

Second Embodiment, FIG. 7, First Speed Change Threshold

The present embodiment shows a case where the leak hole determination device 5 includes a decompression pump 62, and the leak hole determiner 53 changes the first change speed threshold value. The leak hole determiner 53 of the present embodiment is, when the absolute value of the difference between the pressure change speeds of the two pressure detectors 51 and 52 after the limit pressure exceeds the predetermined difference threshold value, configured to change the first change speed threshold value, based on an assumption/estimation that the pressure detected by the first pressure detector 51 is affected by the fuel component remaining in the absorbent 32 of the canister 3.

When the leak hole determiner 53 of the present embodiment determines by the difference determination that the absolute value of the difference between the pressure change speeds of the two pressure detectors 51 and 52 after the limit pressure does not exceed the predetermined difference threshold value, in case that at least one of the following two (A) and (B) is detected, the leak hole determiner 53 determines that a leak hole X is present in the device system. That is, when (A) the first change speed determination indicates that the pressure change speed exceeding an initially set first change speed threshold value is detected by the first pressure detector 51 after the limit pressure, or (B) the second change speed determination indicates that the pressure change speed exceeding an initially set second change speed threshold value is detected by the second pressure detector 52 after the limit pressure, is detected, it is determined that a leak hole X is present in the device system.

Further, when the leak hole determiner 53 of the present embodiment determines by the difference determination that the absolute value of the difference between the pressure change speeds of the two pressure detectors 51 and 52 after the limit pressure exceeds the predetermined difference threshold value, the leak hole determiner 53 is configured to change the first change speed threshold value from an initial setting value to an absorption threshold value greater than the initial setting value. Then, the leak hole determiner 53 determines that a leak hole X is present in the device system when at least one of (A) or (B) is detected. That is, when (A) the first change speed determination indicates that the pressure change speed exceeding the absorption threshold value serving as the first change speed threshold value is detected by the first pressure detector 51 after the limit pressure, or (B) the second change speed determination indicates that the pressure change speed exceeding the initially set second change speed threshold value is detected by the second pressure detector 52 after the limit pressure, is detected, it is determined that a leak hole X is present in the device system.

(Determination Method)

The method of determining the presence or absence of the leak hole X by the leak hole determination device 5 of the present embodiment is described with reference to the flowchart of FIG. 7. The leak hole determiner 53 and the control unit 54 of the leak hole determination device 5 of the present embodiment firstly perform S201 to S206 similar to steps S101 to S106 of the first embodiment. Then, after the depressurization operation by the decompression pump 62 is stopped, the leak hole determiner 53 detects the first pressure and the second pressure within a predetermined time from the limit pressure timing at which the depressurization operation is stopped (Step S207).

Then, the leak hole determiner 53 calculates the change speed of the first pressure within a predetermined time from the limit pressure timing, and calculates the change speed of the second pressure within the predetermined time from the limit pressure timing (Step S208). Then, as a difference determination, the leak hole determiner 53 determines whether or not the absolute value of the difference between the change speed of the first pressure and the change speed of the second pressure exceeds the predetermined difference threshold value (Step S209).

When the absolute value of the difference exceeds the predetermined difference threshold value, the leak hole determiner 53 changes the first change speed threshold value from the initial setting value to the absorption threshold value greater than the initial setting value (Step S210). The absorption threshold value is a value that takes into account the effect of the fuel component flowing out of the absorbent 32 increasing the first pressure. In other words, the absorption threshold value is set to a value greater than the initially set first change speed threshold value and second change speed threshold value.

Then, the leak hole determiner 53 determines, as the first change speed determination, whether or not the change speed of the first pressure exceeds the absorption threshold value serving as the first change speed threshold value (Step S211). When the change speed of the first pressure exceeds the absorption threshold value, the leak hole determiner 53 determines, as the second change speed determination, whether or not the change speed of the second pressure exceeds the second change speed threshold value initially set (Step S212).

Then, when the change speed of the first pressure exceeds the absorption threshold value and the change speed of the second pressure exceeds the second change speed threshold value, the leak hole determiner 53 determines that the intake pipe 71 or the decompression pipe 61 has a leak hole X of a predetermined size or more (Step S213). On the other hand, when the change speed of the first pressure is equal to or less than the absorption threshold value, or when the change speed of the second pressure is equal to or less than the second change speed threshold value, the leak hole determiner 53 determines that there is no leak hole X of a predetermined size or more in the device system (Step S214). In the present embodiment, when the absolute value of the difference between the change speed of the first pressure and the change speed of the second pressure exceeds the predetermined difference threshold value, the first change speed threshold value is changed, thereby improving the determination accuracy of the first change speed determination.

In step S209, when the absolute value of the difference is equal to or less than the predetermined difference threshold value, the leak hole determiner 53 maintains the first change speed threshold value as the initial setting value. Then, as the first change speed determination, the leak hole determiner 53 determines whether or not the change speed of the first pressure exceeds the initially set first change speed threshold value (Step S211). When the change speed of the first pressure exceeds the first change speed threshold value, the leak hole determiner 53 determines, as the second change speed determination, whether or not the change speed of the second pressure exceeds the initially set second change speed threshold value (Step S212).

Then, when the change speed of the first pressure exceeds the first change speed threshold value and the change speed of the second pressure exceeds the second change speed threshold value, the leak hole determiner 53 determines that the intake pipe 71 or the decompression pipe 61 has a leak hole X of a predetermined size or more (Step S213). On the other hand, when the change speed of the first pressure is equal to or less than the first change speed threshold value, or when the change speed of the second pressure is equal to or less than the second change speed threshold value, the leak hole determiner 53 determines that there is no leak hole X having a predetermined size or more in the device system (Step S214).

In the leak hole determination device 5 of the present embodiment, when it is estimated that the change speed of the first pressure is influenced by the fuel component remaining in the absorbent 32 of the canister 3, the first change speed threshold value can be changed so that such influence is mitigated. Further, in the present embodiment, since the limit pressure timing is the end of the depressurization operation, the pressure increase speed detected by the first pressure detector 51 after the limit pressure is increased due to the influence of the fuel component flowing out of the absorbent 32. Then, when the difference between the pressure increase speeds of the two pressure detectors 51 and 52 after the limit pressure exceeds the difference threshold value, the first change speed threshold value is changed to a greater value. As a result, the influence of the fuel component remaining in the absorbent 32 can be mitigated, and the accuracy of determining the presence or absence of the leak hole X in the device system can be improved.

The leak hole determiner 53 may estimate the amount of fuel component absorbed by the absorbent 32 of the canister 3 based on the magnitude of the pressure difference between the two pressure detectors 51 and 52 when performing the difference determination. Then, the leak hole determiner 53 may change the amount of changing the first change speed threshold value according to the amount of absorption of the fuel component. More specifically, the leak hole determiner 53 may be change the first change speed threshold value to a greater value as the amount of absorption of the fuel component increases.

Further, the amount of the fuel component absorbed by the absorbent 32 of the canister 3 may be estimated by other method(s). The amount of absorption may be estimated based on, for example, the open/closed status of the purge valve 44 in the purge pipe 43, the open/closed status of the sealing valve 42 in the vapor pipe 41, the open/closed status of the fuel filler port 21 of the fuel tank 2, the operating status of the purge pump in the purge pipe 43, the change in the pressure of the combustion air or the air-fuel mixture of the combustion air and the fuel in the intake pipe 71 of the engine 7 and the like.

The configuration of the evaporated fuel processing device 1 of the present embodiment is the same as that of the evaporated fuel processing device 1 of the first embodiment. Other configurations, effects, and the like of the leak hole determination device 5 of the present embodiment are the same as those of the leak hole determination device 5 of the first embodiment. Further, also in the present embodiment, the components indicated by the same reference numerals as those shown in the first embodiment are the same as those of the first embodiment.

Figure 8:
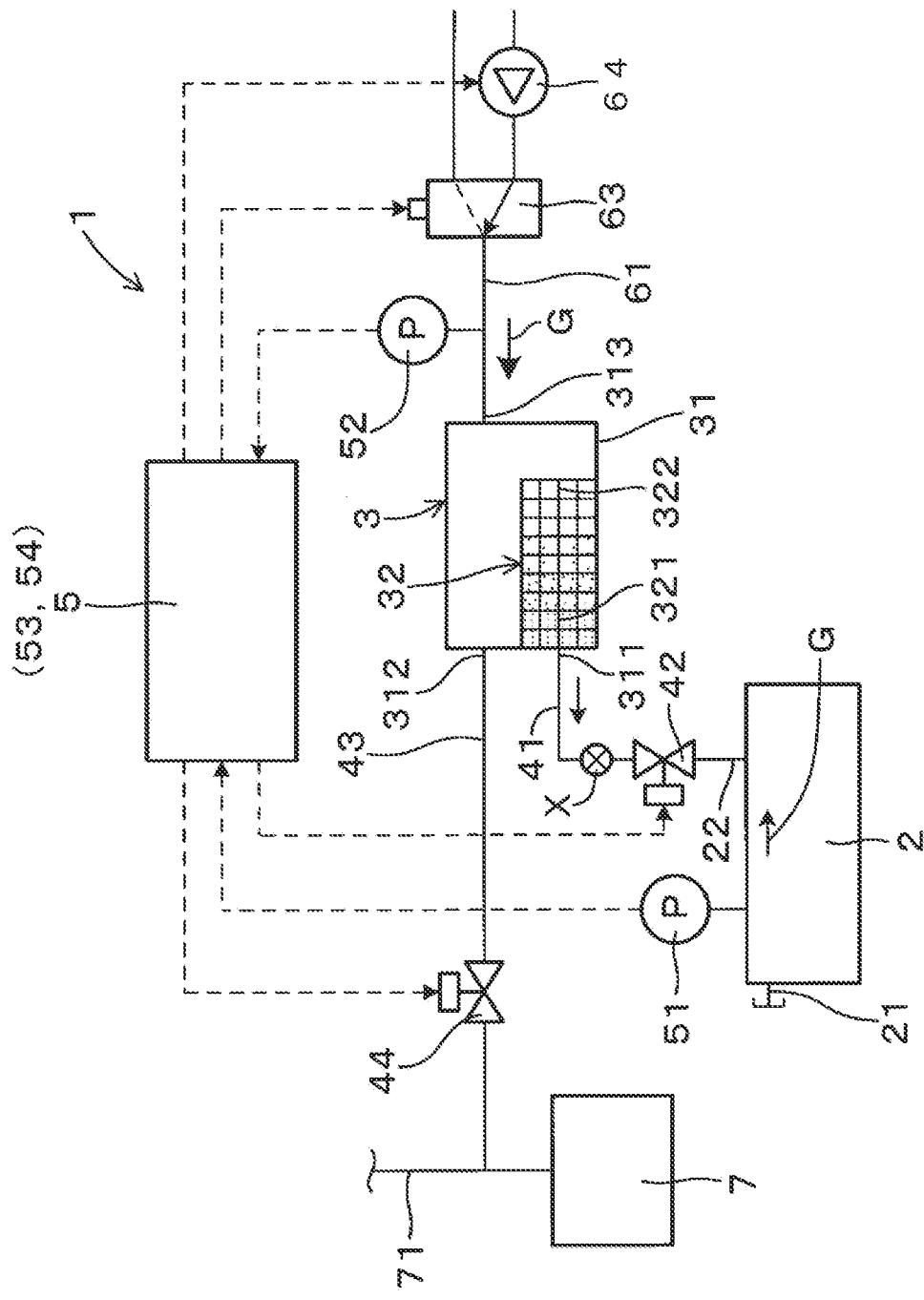
FIG. 8 is an explanatory diagram showing a gas flow after a pressurization operation in the device system of the evaporated fuel processing device when a leak hole is present in the vapor pipe according to the third embodiment.
Figure 9:
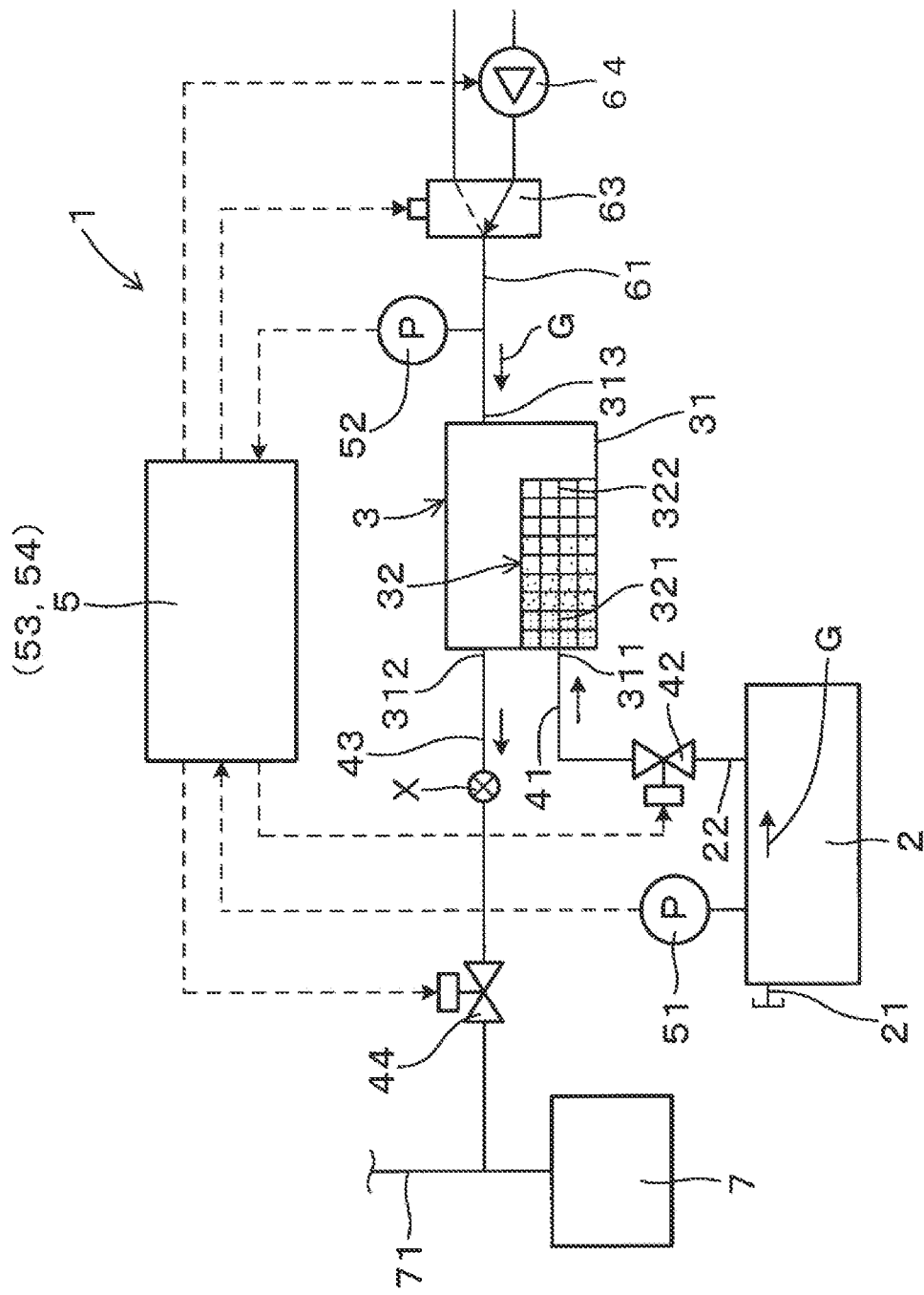
FIG. 9 is an explanatory diagram showing a gas flow after a pressurization operation in the device system of the evaporated fuel processing device when a leak hole is present in the purge pipe according to the third embodiment.

Third Embodiment, FIGS. 8, 9, Pressurization Pump

As shown in FIGS. 8 and 9, the present embodiment shows a case where the leak hole determination device 5 includes a pressurizing pump 64, and where the limit pressure timing is the end of the pressurization operation. The leak hole determination device 5 of the present embodiment includes a pressurizing pump 64 instead of the decompression pump 62, and when the leak hole determiner 53 determines the presence or absence of the leak hole X, the inside of the device system of the evaporated fuel processing device 1 is under a pressurization operation.

The leak hole determination device 5 of the present embodiment includes (i) the pressurizing pump 64 for performing a pressurization operation that pressurizes the inside of the device system including (a) the inside of the fuel tank 2 and (b) the inside of the canister 3, and (ii) the switching valve 63 capable of switching between (c) opening to the atmosphere and (d) pressurizing by the pressurizing pump 64. The operation of the pressurizing pump 64 and the opening/closing operation of the switching valve 63 are controlled by the control unit 54 of the leak hole determination device 5.

The pressurizing pump 64 can pressurize each of the fuel tank 2, the canister 3, the vapor pipe 41, the purge pipe 43, and the decompression pipe 61 in the device system of the evaporated fuel processing device 1. When the pressurization operation is performed by the pressurizing pump 64, the purge pipe 43 is closed by the purge valve 44, and the canister 3 is sealed from the atmosphere by the switching valve 63.

The switching valve 63 can be switched between (a) an open position in which the inside of the canister 3 is opened to the atmosphere and (b) a pressurization position in which the inside of the canister 3 is connected to the pressure pump 64. When the switching valve 63 is switched from the open position to the pressurization position, the pressurizing pump 64 can pressurize the inside of the device system.

The limit pressure in the present embodiment means an upper limit pressure when the pressure rises after the pressurization operation is performed by the pressurizing pump 64. Further, the limit pressure timing of the present embodiment is defined as a timing when the operation of the pressurizing pump 64 is stopped after the operation of the pressurizing pump 64 is started. The pressurizing pump 64 can form the limit pressure when it is necessary to determine the presence or absence of a leak hole.

In the present embodiment, since the limit pressure is realized by the pressurization operation, when the fuel component remains in the absorbent 32 of the canister 3, a relationship between a position where a leak hole X is present in the device system and a pressure change speed is different from that of the first embodiment.

(When the Absorbent 32 has a Fuel Component and a Leak Hole X is Present in the Vapor Pipe 41 or the Fuel Tank 2)

As shown in FIG. 8, when the fuel component is absorbed by the absorbent 32 of the canister 3, and a leak hole X is present in the vapor pipe 41 or the fuel tank 2, the gas G inside the device system after the pressurization operation is performed flows out to the atmosphere through the leak hole X. During such time, when or if the fuel component is absorbed in the portion 321 of the absorbent 32 on one side closer to the fuel tank 2, it makes it difficult for the gas G to flow from one part to the other, i.e., from a farther side of the absorbent 32 (=from the portion 322 farther from the fuel tank 2) to/toward the portion 321 on the one side closer to the fuel tank 2. Further, the fuel component absorbed in the portion 321 of the absorbent 32 on the side closer to the fuel tank 2 gradually flows out to the vapor pipe 41 outside the absorbent 32.

Then, in the device system, a flow of the gas G is caused from an intake pipe 71 side (i.e., an outlet 312 side) and a decompression pump 62 side (i.e., a pressure release port 313 side) toward a fuel tank 2 side (i.e., an inlet 311 side). During such time, the presence of the fuel component in the absorbent 32 makes it difficult for the pressure on the intake pipe 71 side and the decompression pump 62 side to decrease, and the pressure on the intake pipe 71 side and the decompression pump 62 side is maintained to be higher than the pressure on the fuel tank 2 side.

Figure 11A:
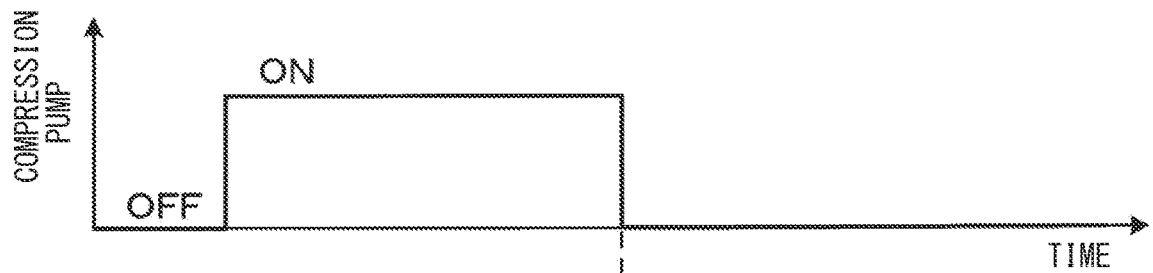
FIGS. 11A to 11C respectively show a graph of (A) an operation of a pressurizing pump, (B) a pressure change detected by the first pressure detector, and (C) a pressure change detected by the second pressure detector according to the third embodiment.
Figure 11B:
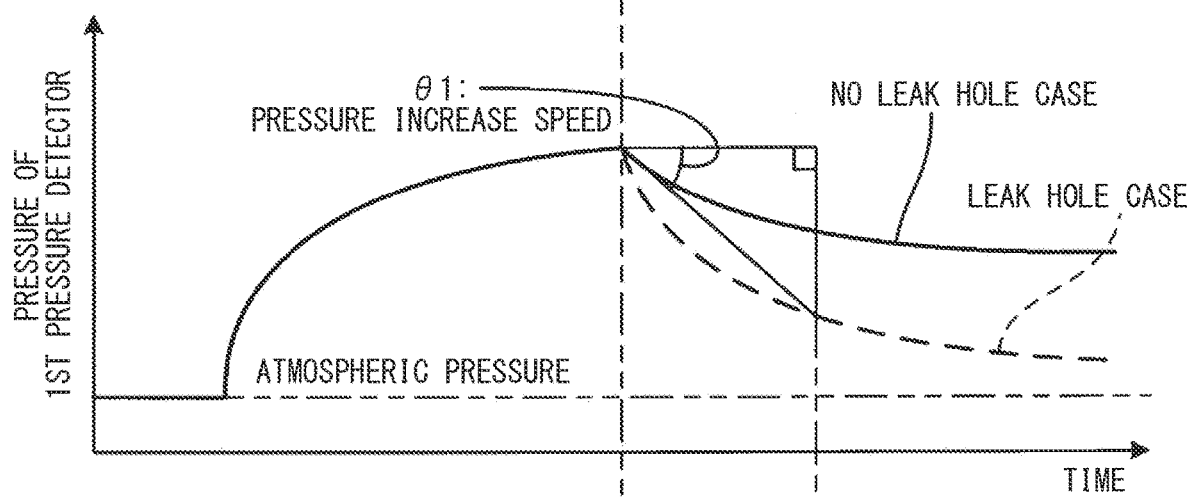
Figure 11C:
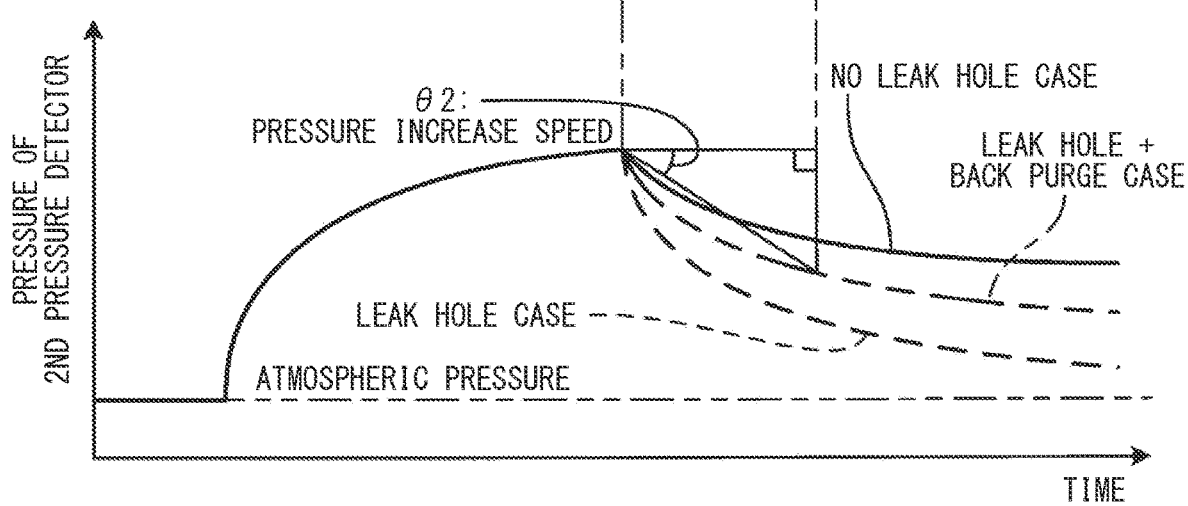

As a result, as shown by the broken line in FIG. 11B and the two dot chain line in FIG. 11C, the decrease speed in pressure detected by the second pressure detector 52 after the limit pressure becomes lower than the decrease speed in pressure detected by the first pressure detector 51 after the limit pressure. Then, the absolute value of the pressure difference between the two pressure detectors 51 and 52 after the limit pressure becomes large, and the absolute value of such difference exceeds the difference threshold value.

(When there is a Fuel Component in the Absorbent 32 and a Leak Hole X is Present in the Purge Pipe 43 or the Decompression Pipe 61)

As shown in FIG. 9, when the fuel component is absorbed by the absorbent 32 of the canister 3, and a leak hole X is present in the purge pipe 43 or the decompression pipe 61, the gas G in the device system is released, i.e., flows out, to the atmosphere through the leak hole X. During such time, the fuel component absorbed in the portion 321 of the absorbent 32 on one side closer to the fuel tank 2 moves toward the portion 322 of the absorbent 32 on the side farther from the fuel tank 2 along with the flow of the gas G, and then in turn causes a flow of the gas G from the tank 2 side (i.e., an inlet 311 side) toward the intake pipe 71 side (i.e., an outlet 312 side) and toward the decompression pump 62 side (i.e., a pressure release port 313 side).

Then, not only the pressure on the fuel tank 2 side decreases, but also the pressure on the intake pipe 71 side and the pressure on the decompression pump 62 side decrease.

As a result, as shown by the broken lines in FIGS. 11B and 11C, a difference between the decrease speed in pressure detected by the first pressure detector 51 after the limit pressure and the decrease speed in pressure detected by the second pressure detector 52 after the limit pressure substantially diminishes. Then, the absolute value of the pressure difference between the two pressure detectors 51 and 52 after the limit pressure becomes small, and the absolute value of such difference becomes equal to or less than the difference threshold value.

In such manner, when the difference determination is performed after the pressurization operation is performed in the device system, it can be determined whether or not a leak hole X of a predetermined size or more is present in the vapor pipe 41 or the fuel tank 2, by determining whether the difference between the two pressure decrease speeds detected by the pressure detectors 51 and 52. In other words, when (a) the fuel component is absorbed by the absorbent 32 of the canister 3, and (b) the vapor pipe 41 or the fuel tank 2 has a leak hole X of a predetermined size or more, the absolute value of the difference between two pressure detectors 51 and 52 may exceed the predetermined difference threshold value.

The leak hole determiner 53 also has a function of estimating the position of the leak hole X in the device system of the evaporated fuel processing device 1 by using the difference in the pressure change speeds of the two pressure detectors 51 and 52 after the limit pressure. When such difference becomes large, it is estimated that a leak hole X of a predetermined size or more is present in the vapor pipe 41 or the fuel tank 2 in the device system. Then, when the absolute value of the difference exceeds the predetermined difference threshold value, the leak hole determiner 53 may estimate that a leak hole X of a predetermined size or more is present in the vapor pipe 41 or the fuel tank 2.

In such manner, the leak hole determiner 53 may be able to estimate that a leak hole X is present on the fuel tank 2 side in the device system.

When the leak hole determiner 53 of the present embodiment determines by the difference determination that the absolute value of the difference between the pressure change speeds of the two pressure detectors 51 and 52 after the limit pressure does not exceed the predetermined difference threshold value, upon detecting at least one of the following two determinations, the leak hole determiner 53 determines that a leak hole X is present in the device system. That is, when, as the first change speed determination, the pressure change speed detected by the first pressure detector 51 after the limit pressure exceeds the predetermined first change speed threshold value, and/or when, as the second change speed determination, the pressure change speed detected by the second pressure detector 52 after the limit pressure exceeds the predetermined second change speed threshold value, it is determined that a leak hole X is present in the device system.

Further, (A) when the leak hole determiner 53 of the present embodiment determines by the difference determination that the absolute value of the difference between the pressure change speeds of the two pressure detectors 51 and 52 after the limit pressure exceeds the predetermined difference threshold value, (B) in case that the pressure change speed is detected as exceeding the predetermined change speed threshold value in the change speed determination by a pressure detector having the smaller pressure change speed among the first and second pressure detectors 51 and 52, it is determined that a leak hole X is present in the device system. More specifically, the leak hole determiner 53 of the present embodiment determines that a leak hole X is present in the device system (A) when the absolute value of the difference in the pressure change speed by the two pressure detectors 51 and 52 after the limit pressure exceeds the predetermined difference threshold value by the difference determination (i.e., as a determination thereof), (B) in case of detecting that the second pressure change speed determination detects that the pressure change speed detected by the second pressure detector 52 exceeds the predetermined second change speed threshold value.

(Pressure Change in Fuel Tank 2 and Canister 3)

FIG. 11A is a graph showing the start and stop timings of pressurization by the pressurizing pump 64. After the pressurization operation by the pressurizing pump 64 is stopped, the pressure change speed detected by the first pressure detector 51 and the pressure change speed detected by the second pressure detector 52 are calculated, respectively.

FIG. 11B is a graph showing a change in pressure (referred to as a first pressure) detected by the first pressure detector 51 when the pressurization operation is performed by the pressurizing pump 64. When no leak hole X is present at any position in the device system, the gas G does not flow out from the inside of the device system to the outside through the leak hole X, and, as shown by the solid line in FIG. 11B, the decrease speed of the first pressure from the limit pressure timing at which the pressure operation is stopped lowers.

On the other hand, when a leak hole X is present in the device system but the fuel component is not absorbed by the absorbent 32 of the canister 3, the gas G flowing out from the inside of the device system through the leak hole X causes an increase of the decrease speed of the first pressure from the limit pressure timing at which the pressurization operation is stopped, as shown by the broken line in FIG. 11B. During such time, even when the fuel component is absorbed by the absorbent 32 of the canister 3, the decrease speed of the first pressure is the same as that of the broken line in FIG. 11B.

FIG. 11C is a graph showing a change in pressure (referred to as a second pressure) detected by the second pressure detector 52 when the pressurization operation is performed by the pressurizing pump 64. When no leak hole X is present in the device system, the gas G does not flow out from the inside of the device system through the leak hole X, and the increase speed of the second pressure becomes lower (i.e., decreases) from the limit pressure timing at which the pressurization operation is stopped as shown by the solid line in FIG. 11C.

On the other hand, when a leak hole X is present at a position on the fuel tank 2 side in the device system, the gas G flowing out of the inside of the device system through the leak hole X causes an increase of the decrease speed of the second pressure from the limit pressure timing at which the pressurization operation is stopped, as shown by the broken line in FIG. 11C. Further, when a leak hole X is present on the fuel tank 2 side in the device system and the fuel component is absorbed by the absorbent 32 of the canister 3, due to the influence of such fuel component absorbed by the absorbent 32, the second pressure is difficult to decrease in comparison to a situation in which no fuel component is absorbed by the absorbent 32 of the canister 3, as shown by the two-dot chain line in FIG. 11C, though a leak hole X is present in the device system.

FIG. 11B shows the inclination angle 81 of the decrease speed of the first pressure when (a) a leak hole X is present on the fuel tank 2 side in the device system and (b) the fuel component is absorbed by the absorbent 32 of the canister 3. Further, FIG. 11C shows the inclination angle 82 of the decrease speed of the second pressure when (a) a leak hole X is present on the fuel tank 2 side in the device system and (b) the fuel component is absorbed by the absorbent 32 of the canister 3. It can be seen that the inclination angle 81 indicating the decrease speed of the first pressure is greater than the inclination angle 82 indicating the decrease speed of the second pressure, and the difference between the decrease speed of the first pressure and the decrease speed of the second pressure becomes large.

(Determination Method)

Figure 12:
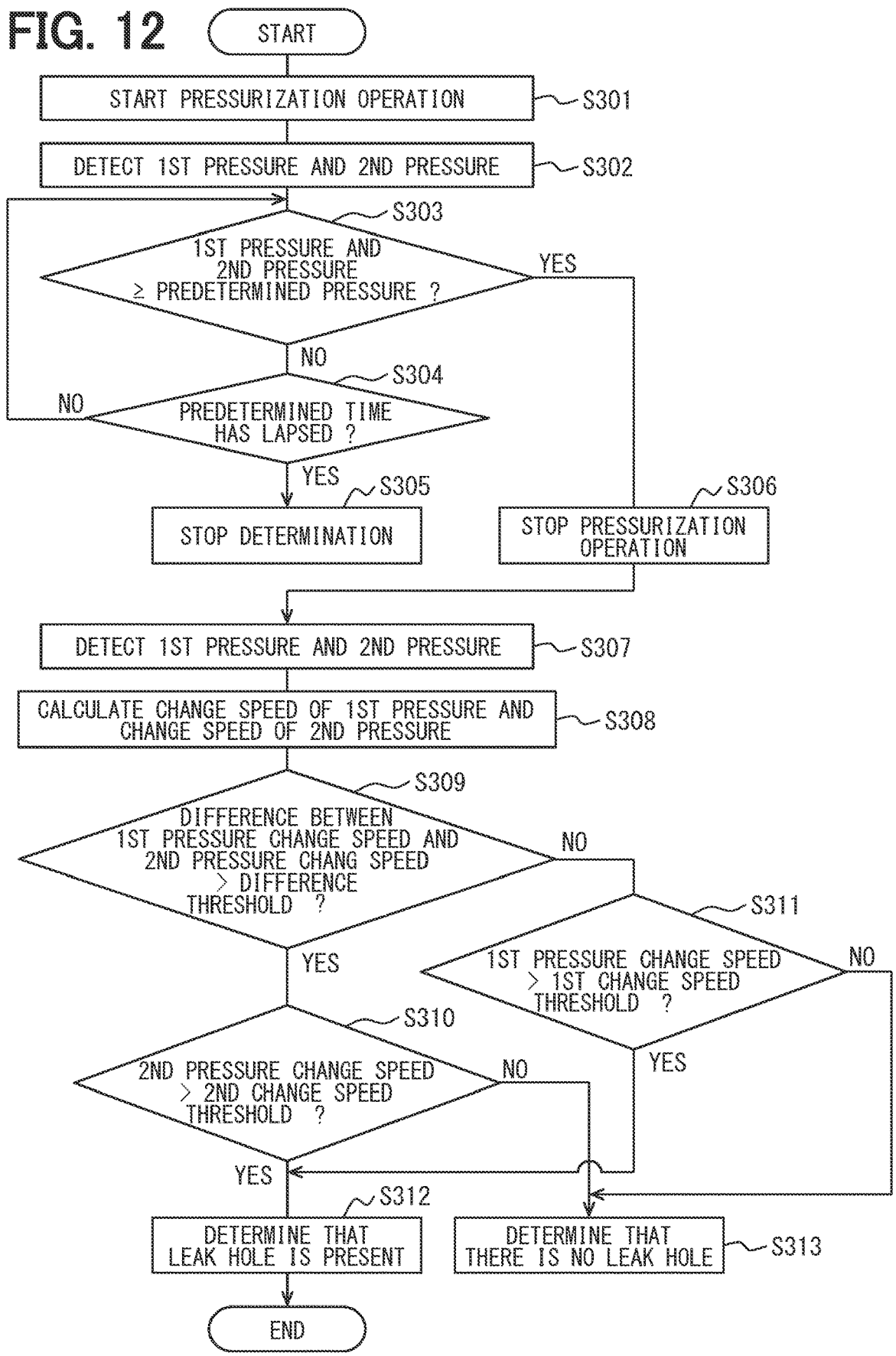
FIG. 12 is a flowchart showing a determination method of the leak hole determination device according to the third embodiment.

Next, a method of determining the presence or absence of the leak hole X by the leak hole determination device 5 is described with reference to the flowchart of FIG. 12. When determining the presence or absence of the leak hole X, the control unit 54 of the leak hole determination device 5 opens the vapor pipe 41 by opening the sealing valve 42 and closes the purge pipe 43 by closing the purge valve 44. Further, the control unit 54 sets the switching valve 63 to the pressurization position, operates the pressurizing pump 64, and pressurizes the inside of the device system including the fuel tank 2 and the canister 3 by the pressurizing pump 64 as a pressurization operation (Step S301 in FIG. 12).

Then, the leak hole determiner 53 detects the pressure in the fuel tank 2 by the first pressure detector 51, and detects the pressure in the canister 3 by the second pressure detector 52 (Step S302). Then, the leak hole determiner 53 determines whether or not the pressure (referred to as the first pressure) by the first pressure detector 51 is equal to or higher than the predetermined pressure, and whether or not the pressure detected by the second pressure detector 52 (referred to as the second pressure) is equal to or higher than the predetermined pressure (Step S303). When at least one of the first pressure and the second pressure does not exceed the predetermined pressure even after the pressurization operation is performed for a predetermined time (Step S304), the leak hole determiner 53 determines the situation as either one of (a) having a large leak hole X in the device system or (b) a failure of the pressure pump 64 or the like failure, and the determination of the presence or absence of the leak hole X is stopped (Step S305).

On the other hand, when both the first pressure and the second pressure become equal to or higher than the predetermined pressure, the control unit 54 stops the pressurization operation by the pressurizing pump 64 (Step S306). Then, the leak hole determiner 53 detects the first pressure and the second pressure within a predetermined time from the limit pressure timing at which the pressurization operation is stopped (Step S307).

Then, the leak hole determiner 53 calculates the change speed of the first pressure within the predetermined time from the limit pressure timing, and calculates the change speed of the second pressure within the predetermined time from the limit pressure timing (Step S308). Then, as a difference determination, the leak hole determiner 53 determines whether or not the absolute value of the difference between the change speed of the first pressure and the change speed of the second pressure exceeds the predetermined difference threshold value (Step S309).

When the absolute value of the difference exceeds the predetermined difference threshold value, the leak hole determiner 53 estimates that (a) a leak hole X is present in in the vapor pipe 41 or the fuel tank 2, and (b) the fuel component absorbed by the absorbent 32 of the canister 3 makes it difficult for the second pressure to decrease, thereby making the change speed of the second pressure smaller than the change speed of the first pressure. Then, as the second change speed determination, the leak hole determiner 53 determines whether or not the change speed of the second pressure exceeds the predetermined second change speed threshold value (Step S310).

Figure 10:
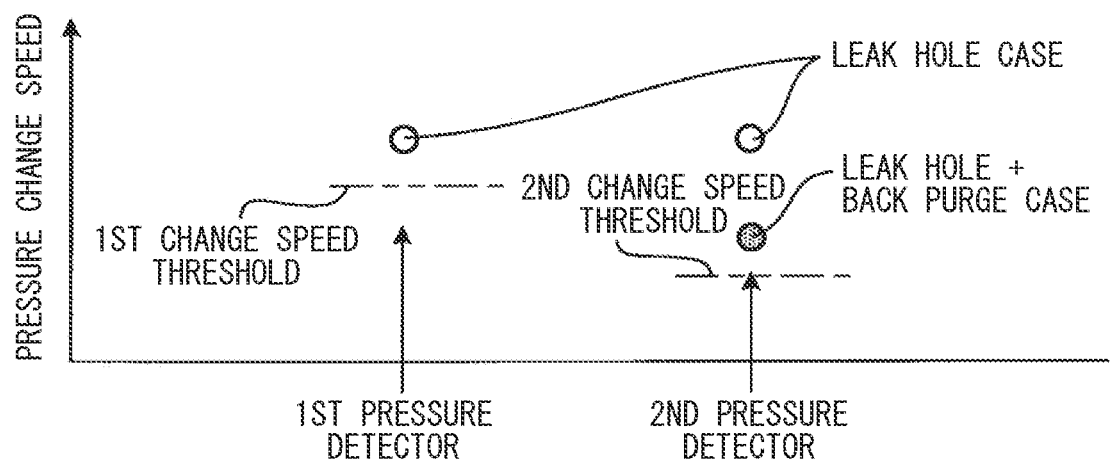
FIG. 10 is a graph showing a pressure change speed detected by the first pressure detector and a pressure change speed detected by the second pressure detector according to the third embodiment.

When the change speed of the second pressure exceeds the predetermined second change speed threshold value, the leak hole determiner 53 determines that the vapor pipe 41 or the fuel tank 2 has a leak hole X of a predetermined size or more (Step S312). The second change speed threshold value can be set to a value smaller than usual in consideration of the influence that the fuel component absorbed by the absorbent 32 which slows down the decrease speed of the second pressure. In other words, as shown in FIG. 10, the second change speed threshold value can be set to a value smaller than the first change speed threshold value. In such manner, the presence or absence of the leak hole X can be determined in consideration of the fact that the fuel component is absorbed by the absorbent 32. On the other hand, when the change speed of the second pressure is equal to or less than the predetermined second change speed threshold value, the leak hole determiner 53 determines that no leak hole X of a predetermined size or more is present in the device system (Step S313).

In step S309, when the absolute value of the difference is equal to or less than the predetermined difference threshold value, the leak hole determiner 53 determines whether or not the change speed of the first pressure exceeds the predetermined first change speed threshold value as the first change speed determination (Step S311). When the change speed of the first pressure exceeds the predetermined first change speed threshold value, the leak hole determiner 53 determines that a leak hole X of a predetermined size or more is present at any position in the device system (Step S312). The first change speed threshold value can be set to a normal/usual value regardless of whether or not the fuel component is absorbed by the absorbent 32. On the other hand, when the change speed of the first pressure is equal to or less than the predetermined first change speed threshold value, the leak hole determiner 53 determines that no leak hole X of a predetermined size or more is present in the device system (Step S313).

(Effects)

In the leak hole determination device 5 of the present embodiment, when (a) the fuel component of the evaporated fuel F remains in the canister 3, and (b) the leak hole X is present in the vapor pipe 41 or in the fuel tank 2 in the device system, the difference between the pressure change speeds of the two pressure detectors 51 and 52 may become large. Then, by using such phenomenon that the difference becomes large for determining the presence or absence of the leak hole X, the accuracy of the determination of the presence or absence of the leak hole X can be improved.

Therefore, even when the fuel component of the evaporated fuel F remains in the canister 3, the leak hole determination device 5 of the evaporated fuel processing device 1 of the present embodiment is capable of accurately determining the presence or absence of the leak hole X.

The configuration of the evaporated fuel processing device 1 of the present embodiment is the same as that of the evaporated fuel processing device 1 of the first embodiment. Other configurations, effects, and the like of the leak hole determination device 5 of the present embodiment are the same as those of the leak hole determination device 5 of the first embodiment. Further, also in the present embodiment, the components indicated by the same reference numerals as those shown in the first embodiment are the same as those of the first embodiment.

Figure 13:
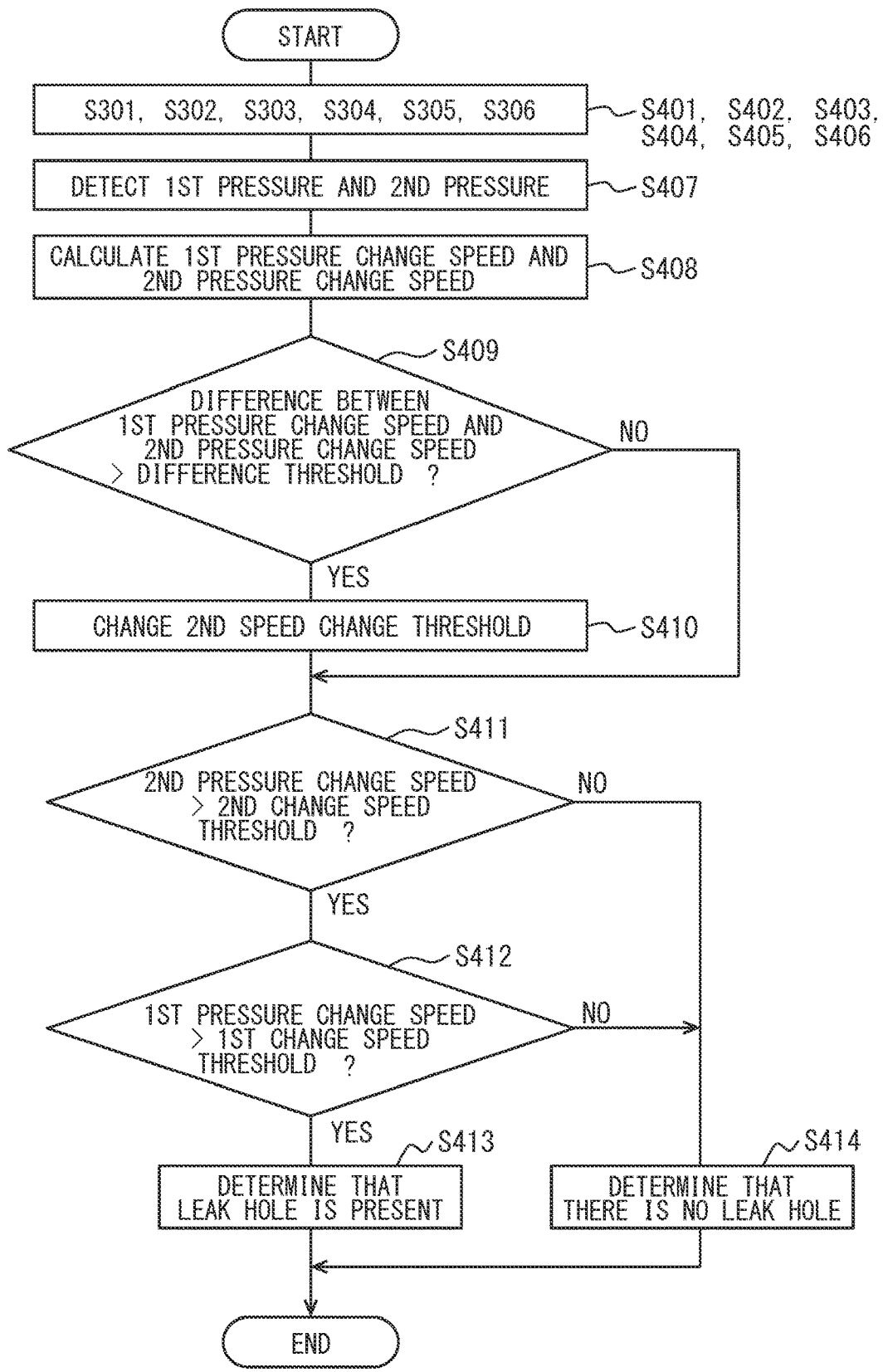
FIG. 13 is a flowchart showing a determination method of the leak hole determination device according to a fourth embodiment.

Fourth Embodiment, FIG. 13

The present embodiment shows an example in which the leak hole determination device 5 includes the pressurizing pump 64, and the leak hole determiner 53 changes the second change speed threshold value. The leak hole determiner 53 of the present embodiment estimates, when the absolute value of the difference between the pressure change speeds of the two pressure detectors 51 and 52 after the limit pressure exceeds the predetermined difference threshold value, that the pressure detected by the second pressure detector 52 is affected by the fuel component remaining in the absorbent 32 of the canister 3, and is configured to change the second change speed threshold value.

When the leak hole determiner 53 of the present embodiment determines by the difference determination that the absolute value of the difference between the pressure change speeds of the two pressure detectors 51 and 52 after the limit pressure does not exceed the predetermined difference threshold value, upon detecting at least one of the following two determinations, the leak hole determiner 53 determines that a leak hole X is present in the device system. That is, when, as the first change speed determination, the pressure change speed detected by the first pressure detector 51 after the limit pressure exceeds the initially set first change speed threshold value, and/or when, as the second change speed determination, the pressure change speed detected by the second pressure detector 52 after the limit pressure exceeds the initially set second change speed threshold value, it is determined that a leak hole X is present in the device system.

Further, when the leak hole determiner 53 of the present embodiment determines by the difference determination that the absolute value of the difference between the pressure change speeds of the two pressure detectors 51 and 52 after the limit pressure exceeds the predetermined difference threshold value, the leak hole determiner 53 is configured to change the second change speed threshold value from the initial setting value to an absorption threshold value smaller than the initial setting value. Then, the leak hole determiner 53 determines that a leak hole X is present in the device system, when at least one of the following (A) and (B) is detected, that is, (A) as the first change speed determination, the pressure change speed detected by the first pressure detector 51 after the limit pressure exceeds the first change speed threshold value and, (B) as the second change speed determination, the pressure change speed detected by the second pressure detector 52 after the limit pressure exceeds the absorption threshold value serving as the second change speed threshold value.

(Determination Method)

The method of determining the presence or absence of the leak hole X by the leak hole determination device 5 of the present embodiment is described with reference to the flowchart of FIG. 13. The leak hole determiner 53 and the control unit 54 of the leak hole determination device 5 of the present embodiment firstly perform steps S401 to S406 similar to steps S301 to S306 of the third embodiment. Then, after the pressurization operation by the pressurizing pump 64 is stopped, the leak hole determiner 53 detects the first pressure and the second pressure within a predetermined time from the limit pressure timing at which the pressurization operation is stopped (Step S407).

Then, the leak hole determiner 53 calculates the change speed of the first pressure within a predetermined time from the limit pressure timing, and also calculates the change speed of the second pressure within the predetermined time from the limit pressure timing (Step S408). Then, as a difference determination, the leak hole determiner 53 determines whether or not the absolute value of the difference between the change speed of the first pressure and the change speed of the second pressure exceeds the predetermined difference threshold value (Step S409).

When the absolute value of the difference exceeds the predetermined difference threshold value, the leak hole determiner 53 changes the second change speed threshold value from the initial setting value to an absorption threshold value smaller than the initial setting value (Step S410). The absorption threshold value is a value that takes into account the effect that the fuel component flowing out of the absorbent 32 makes it difficult for the second pressure to decrease. In other words, the absorption threshold value is set to a value smaller than the initially set first change speed threshold value and second change speed threshold value.

Then, the leak hole determiner 53 determines, as the second change speed determination, whether or not the change speed of the second pressure exceeds the absorption threshold value serving as the second change speed threshold value (Step S411). When the change speed of the second pressure exceeds the absorption threshold value, the leak hole determiner 53 determines, as the first change speed determination, whether or not the change speed of the first pressure exceeds the initially set first change speed threshold value (Step S412).

Then, when the change speed of the second pressure exceeds the absorption threshold value and the change speed of the first pressure exceeds the first change speed threshold value, the leak hole determiner 53 determines the vapor pipe 41 or the fuel tank 2 has a leak hole X having a predetermined size equal to or equal to or greater than the above is present (Step S413). On the other hand, when the change speed of the second pressure is equal to or less than the absorption threshold value, or when the change speed of the first pressure is equal to or less than the first change speed threshold value, the leak hole determiner 53 has a predetermined size in the device system. It can be determined that the above leakage hole X has not occurred (Step S414). In the present embodiment, when the absolute value of the difference between the change speed of the first pressure and the change speed of the second pressure exceeds the predetermined difference threshold value, the second change speed threshold value is changed to perform the second. The determination accuracy of the change speed determination can be improved.

In step S409, when the absolute value of the difference is equal to or less than the predetermined difference threshold value, the leak hole determiner 53 maintains the second change speed threshold value as the initial setting value. Then, as the second change speed determination, the leak hole determiner 53 determines whether or not the change speed of the second pressure exceeds the initially set second change speed threshold value (Step S411). When the change speed of the second pressure exceeds the second change speed threshold value, the leak hole determiner 53 determines, as the first change speed determination, whether the change speed of the first pressure exceeds the initially set first change speed threshold value (Step S412).

When the change speed of the second pressure exceeds the second change speed threshold value and the change speed of the first pressure exceeds the first change speed threshold value, the leak hole determiner 53 determines that a leak hole X of a predetermined size or more is present in the vapor pipe 41 or the fuel tank 2 (Step S413). On the other hand, when the change speed of the second pressure is equal to or less than the second change speed threshold value, or when the change speed of the first pressure is equal to or less than the first change speed threshold value, the leak hole determiner 53 determines that no leak hole X equal to or greater than the predetermined size is present in the device system (Step S414).

In the leak hole determination device 5 of the present embodiment, when it is estimated that the change speed of the second pressure is influenced by the fuel component remaining in the absorbent 32 of the canister 3, such influence is mitigated by changing the second change speed threshold value. Further, in the present embodiment, since the limit pressure timing is the end of the pressurization operation, the decrease speed in pressure detected by the second pressure detector 52 after the limit pressure is affected, i.e., lowers, under the influence of the fuel component absorbed by the absorbent 32. In such a situation, when the difference between the two decrease speeds respectively detected by the pressure detectors 51 and 52 after the limit pressure exceeds the difference threshold value, the second change speed threshold value is changed to a smaller value. As a result, the influence of the fuel component remaining in the absorbent 32 can be mitigated, and the accuracy of determining the presence or absence of the leak hole X in the device system can be improved.

The leak hole determiner 53 may estimate the amount of fuel component absorbed by the absorbent 32 of the canister 3 based on the magnitude of the pressure difference between the two pressure detectors 51 and 52 when performing the difference determination. Then, the leak hole determiner 53 may change the amount of change of the second change speed threshold value according to the amount of absorption of the fuel component. More specifically, the leak hole determiner 53 may change the second change speed threshold value to a smaller value as the amount of absorption of the fuel component increases.

The basic configuration of the evaporated fuel processing device 1 of the present embodiment is the same as that of the evaporated fuel processing device 1 of the first embodiment. Other configurations, effects, and the like of the leak hole determination device 5 of the present embodiment are the same as those of the leak hole determination device 5 of the first and second embodiments. Further, also in the present embodiment, the components indicated by the same reference numerals as those shown in the first and second embodiments are the same as those of the first and second embodiments.

Figure 14:
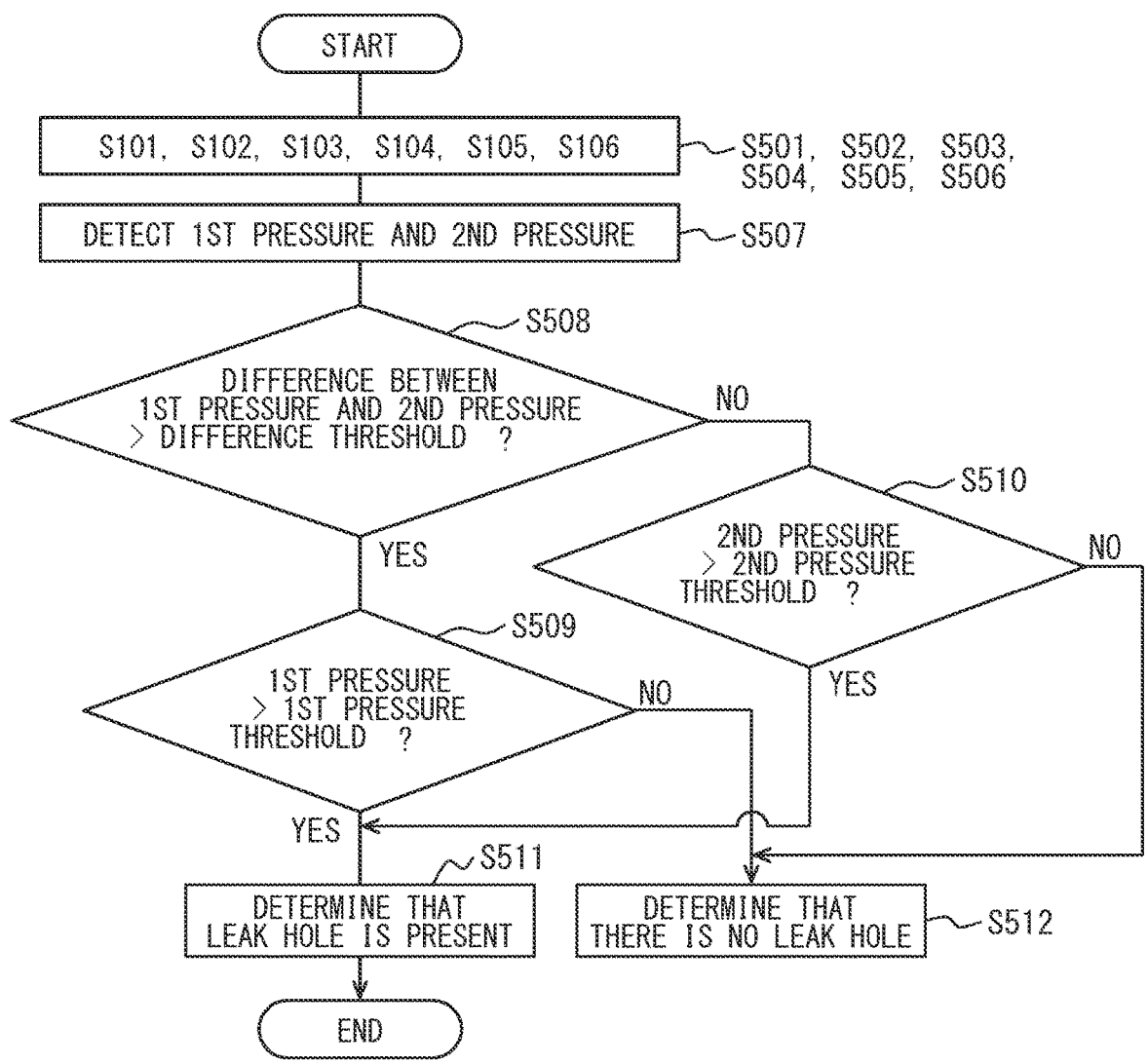
FIG. 14 is a flowchart showing a determination method of the leak hole determination device according to a fifth embodiment.

Fifth Embodiment, FIG. 14

In the present embodiment, the difference determination of the leak hole determiner 53 is different from the first to fourth embodiments, and the leak hole determiner 53 uses, instead of using the first change speed determination and the second change speed determination, a first pressure determination and a second pressure determination. In the difference determination of the leak hole determiner 53 of the present embodiment, the absolute value of the difference between (i) the pressure detected by the first pressure detector 51 after the limit pressure and (ii) the pressure detected by the second pressure detector 52 after the limit pressure is determined as to whether the absolute value of such difference exceeds a predetermined threshold value. The leak hole determiner 53 of the present embodiment determines whether a leak hole is present by combining (a) a difference determination and at least one of (b-1) a first pressure determination for determining whether or not the pressure detected by the first pressure detector 51 after the limit pressure exceeds a predetermined first pressure threshold value, and (b-2) a second pressure determinations for determining whether or not the pressure detected by the second pressure detector 52 after the limit pressure exceeds a predetermined second pressure threshold value.

The pressure detected by the first pressure detector 51 after the limit pressure and the pressure detected by the second pressure detector 52 after the limit pressure are the pressures after a lapse of the same predetermined time from the limit pressure timing. In other words, the pressure detected by the first pressure detector 51 and the pressure detected by the second pressure detector 52 are values detected at the same timing.

The leak hole determination device 5 of the present embodiment determines whether a leak hole X is present after the limit pressure which starts after the end of the depressurization operation performed by the decompression pump 62. The difference determination, the first pressure determination, and the second pressure determination of the leak hole determination device 5 in the present embodiment are, respectively, configured as replacing (i) the pressure change speed in the first embodiment with (ii) the pressure itself.

The leak hole determiner 53 of the present embodiment is configured to switch between the two determination schemes, i.e., (i) a first scheme that uses one of the first pressure determination and the second pressure determination and (ii) a second scheme that uses both of the first and second pressure determinations, depending on whether or not the absolute value of the difference in the difference determination exceeds the predetermined difference threshold value. With such configuration, it is possible to improve the accuracy of determining the presence or absence of the leak hole X by the leak hole determination device 5 in consideration of a unique pressure change state that is caused when the fuel component is absorbed by the absorbent 32 of the canister 3.

The leak hole determiner 53 of the present embodiment determines that a leak hole is present in the device system, (A) when it is determined by the difference determination that the absolute value of the pressure difference between the two pressure detectors 51 and 52 after the limit pressure does not exceed the predetermined difference threshold value, and (B) when at least one of the first and second pressure determinations determines that the pressure after the limit pressure timing detected by the first and/or second detector 51, 52 exceeds the first and/or second pressure threshold value (i.e., when (A) and (B) are both satisfied).

Further, when the leak hole determiner 53 of the present embodiment determines by the difference determination that the absolute value of the pressure difference between the two pressure detectors 51 and 52 after the limit pressure exceeds the predetermined difference threshold value, the leak hole determiner 53 determines that a leak hole is present in the device system when it is detected that the pressure detected by one of the first and second pressure detectors 51, 52 detecting a higher pressure exceeds predetermined pressure threshold value. More specifically, when the leak hole determiner 53 of the present embodiment determines by the difference determination that the absolute value of the pressure difference between the two pressure detectors 51 and 52 after the limit pressure exceeds the predetermined difference threshold value, it is determined that a leak hole X is present in the device system in case it is detected by the first pressure determination that the pressure detected by the first pressure detector 51 exceeds the predetermined first pressure threshold value.

(Determination Method)

The method of determining the presence or absence of the leak hole X by the leak hole determination device 5 of the present embodiment is described with reference to the flowchart of FIG. 14. The leak hole determiner 53 and the control unit 54 of the leak hole determination device 5 of the present embodiment firstly perform steps S501 to S506 similar to steps S101 to S106 of the first embodiment. Then, after the depressurization operation by the decompression pump 62 is stopped, the leak hole determiner 53 detects the first pressure and the second pressure within a predetermined time from the limit pressure timing at which the depressurization operation is stopped (Step S507). Then, the leak hole determiner 53 determines, as a difference determination, whether or not the absolute value of the difference between the first pressure and the second pressure exceeds the predetermined difference threshold value (Step S508).

When the absolute value of the difference exceeds the predetermined difference threshold value, the leak hole determiner 53 can estimate that a leak hole X is present in the intake pipe 71 or the decompression pipe 61, and the fuel component absorbed by the absorbent 32 of the canister 3 flows out of the absorbent 32 causes the first pressure to be higher than the second pressure. Then, as the first pressure determination, the leak hole determiner 53 determines whether or not the first pressure exceeds the predetermined first pressure threshold value (Step S509).

When the first pressure exceeds the predetermined first pressure threshold value, the leak hole determiner 53 can determine that the intake pipe 71 or the decompression pipe 61 has a leak hole X of a predetermined size or more (Step S511). The first pressure threshold value can be set to a value greater than usual in consideration of the influence of the fuel component flowing out of the absorbent 32 increasing the first pressure. In other words, the first pressure threshold value can be set to a value greater than the second pressure threshold value. In such manner, the presence or absence of the leak hole X can be determined in consideration of the fact that the fuel component is absorbed by the absorbent 32. On the other hand, when the first pressure is equal to or less than the predetermined first pressure threshold value, the leak hole determiner 53 can determine that no leak hole X of a predetermined size or more is present in the device system (Step S512).

In step S508, when the absolute value of the difference is equal to or less than the predetermined difference threshold value, the leak hole determiner 53 determines whether or not the second pressure exceeds the predetermined second pressure threshold value as the second pressure determination (Step S510). When the second pressure exceeds the predetermined second pressure threshold value, the leak hole determiner 53 can determine that a leak hole X of a predetermined size or more is present at any position in the device system (Step S511). The second pressure threshold value can be set to a normal/usual value regardless of whether or not the fuel component is absorbed by the absorbent 32. On the other hand, when the second pressure is equal to or less than the predetermined second pressure threshold value, the leak hole determiner 53 can determine that no leak hole X of a predetermined size or more is present in the device system (Step S512).

In the leak determination device of the present embodiment, when determining the presence or absence of the leak hole X, the pressure is used without using the pressure change speed. In such manner, the configuration of the leak hole determination device 5 may be simplified.

The configuration of the evaporated fuel processing device 1 of the present embodiment is the same as that of the first embodiment. Other configurations, effects, and the like of the leak hole determination device 5 of the present embodiment are the same as those of the leak hole determination device 5 of the first embodiment. Further, also in the present embodiment, the components indicated by the same reference numerals as those shown in the first embodiment are the same as those of the first embodiment.

Figure 15:
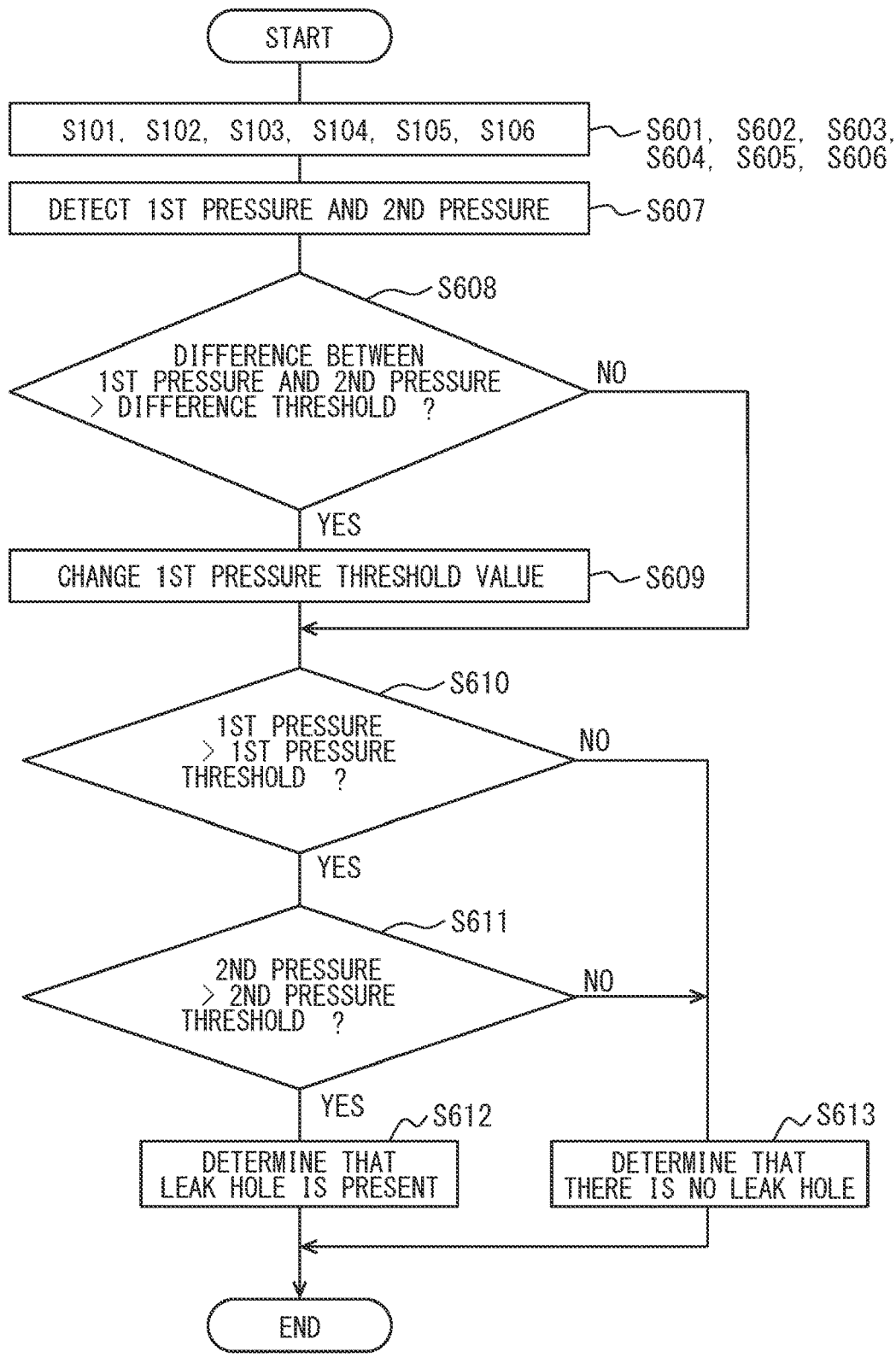
FIG. 15 is a flowchart showing a determination method of the leak hole determination device according to a sixth embodiment.

Sixth Embodiment, FIG. 15

The present embodiment shows an example in which the leak hole determination device 5 includes the decompression pump 62, and the leak hole determiner 53 changes the first pressure threshold value of the fifth embodiment. The leak hole determiner 53 of the present embodiment estimates, when the absolute value of the pressure difference between the two pressure detectors 51 and 52 after the limit pressure exceeds the predetermined difference threshold value, that the pressure detected by the first pressure detector 51 is increased under the influence of the fuel component remaining in the absorbent 32 of the canister 3, and the leak hole determiner 53 is configured to change the first pressure threshold value.

When the leak hole determiner 53 of the present embodiment determines by the difference determination that the absolute value of the pressure difference between the two pressure detectors 51 and 52 after the limit pressure does not exceed the predetermined difference threshold value, the leak hole determiner 53 determines that a leakage hole X is present in the device system, in case of detecting at least one of the following two, i.e., (i) when, by the first pressure determination, the pressure detected by the first pressure detector 51 after the limit pressure exceeds the initially set first pressure threshold value, and, (ii) when, by the second pressure determination, the pressure detected by the second pressure detector 52 after the limit pressure exceeds the initially set second pressure threshold value.

Further, when the leak hole determiner 53 of the present embodiment determines by the difference determination that the absolute value of the pressure difference between the two pressure detectors 51 and 52 after the limit pressure exceeds the predetermined difference threshold value, the leak hole determiner 53 is configured to change the first pressure threshold value from the initial setting value to an absorption threshold value greater than the initial setting value. Then, upon detecting at least one of (a) and (b), i.e., (a) as the first pressure determination, the leak hole determiner 53 determines that the pressure detected by the first pressure detector 51 after the limit pressure exceeds the absorption threshold value serving as the first pressure threshold value, and (b) as the second pressure determination, the leak hole determiner 53 determines that the pressure detected by the second pressure detector 52 after the time of pressure exceeds the initially set second pressure threshold value, it is determined that a leak hole X is present in the device system.

(Determination Method)

The method of determining the presence or absence of the leak hole X by the leak hole determination device 5 of the present embodiment is described with reference to the flowchart of FIG. 15. The leak hole determiner 53 and the control unit 54 of the leak hole determination device 5 of the present embodiment firstly perform steps S601 to S606 similar to steps S101 to S106 of the first embodiment. Then, after the depressurization operation by the decompression pump 62 is stopped, the leak hole determiner 53 detects the first pressure and the second pressure within a predetermined time from the limit pressure timing at which the depressurization operation is stopped (Step S607).

Then, as a difference determination, the leak hole determiner 53 determines whether or not the absolute value of the difference between the first pressure and the second pressure exceeds the predetermined difference threshold value (Step S608). When the absolute value of the difference exceeds the predetermined difference threshold value, the leak hole determiner 53 changes the first pressure threshold value from the initial setting value to the absorption threshold value greater than the initial setting value (Step S609). The absorption threshold value is a value that takes into account the effect of the fuel component flowing out of the absorbent 32 increasing the first pressure. In other words, the absorption threshold value is set to a value greater than the initially set first pressure threshold value and second pressure threshold value.

Then, as the first pressure determination, the leak hole determiner 53 determines whether or not the first pressure exceeds the absorption threshold value serving as the first pressure threshold value (Step S610). When the first pressure exceeds the absorption threshold value, the leak hole determiner 53 determines whether or not the second pressure exceeds the initially set second pressure threshold value serving as the second pressure determination (Step S611).

In such a situation, when the first pressure exceeds the absorption threshold value and the second pressure exceeds the second pressure threshold value, the leak hole determiner 53 can determine that a leak hole X of a predetermined size or more is present in the intake pipe 71 or the decompression pipe 61 (Step S612). On the other hand, when the first pressure is equal to or less than the absorption threshold value, or when the second pressure is equal to or less than the second pressure threshold value, the leak hole determiner 53 can determine that a leak hole X of a predetermined size or more in the device system (Step S613). In the present embodiment, when the absolute value of the difference between the first pressure and the second pressure exceeds the predetermined difference threshold value, the determination accuracy of the first pressure determination is improved by changing the first pressure threshold value.

In step S608, when the absolute value of the difference is equal to or less than the predetermined difference threshold value, the leak hole determiner 53 maintains the first pressure threshold value as the initial setting value. Then, as the first pressure determination, the leak hole determiner 53 determines whether or not the first pressure exceeds the initially set first pressure threshold value (Step S610). When the first pressure exceeds the first pressure threshold value, the leak hole determiner 53 determines whether or not the second pressure exceeds the initially set second pressure threshold value as the second pressure determination (Step S611).

Then, when the first pressure exceeds the first pressure threshold value and the second pressure exceeds the second pressure threshold value, the leak hole determiner 53 can determine that a leak hole X of a predetermined size or more is present in the intake pipe 71 or the decompression pipe 61 (Step S612). On the other hand, when the first pressure is equal to or less than the first pressure threshold value, or when the second pressure is equal to or less than the second pressure threshold value, the leak hole determiner 53 can determine that no leak hole X of a predetermined size or more is formed in the device system (Step S613).

In the leak hole determination device 5 of the present embodiment, when it is estimated that the first pressure is influenced by the fuel component remaining in the absorbent 32 of the canister 3, the first pressure threshold value is changed to mitigate such influence. Further, in the present embodiment, since the limit pressure timing is the end of the depressurization operation, the pressure detected by the first pressure detector 51 after the limit pressure becomes higher due to the influence of the fuel component flowing out of the absorbent 32. In such a situation, when the pressure difference between the two pressure detectors 51 and 52 after the limit pressure exceeds the difference threshold value, the first pressure threshold value is changed to a greater value. As a result, the influence of the fuel component remaining in the absorbent 32 can be mitigated, and the accuracy of determining the presence or absence of the leak hole X in the device system can be improved.

The leak hole determiner 53 may estimate the amount of fuel component absorbed by the absorbent 32 of the canister 3 based on the magnitude of the pressure difference between the two pressure detectors 51 and 52 when performing the difference determination. Then, the leak hole determiner 53 may change the amount of change of the first pressure threshold value according to the amount of absorption of the fuel component. More specifically, the leak hole determiner 53 may change the first pressure threshold value to a greater value as the amount of absorption of the fuel component increases.

The configuration of the evaporated fuel processing device 1 of the present embodiment is the same as that of the evaporated fuel processing device 1 of the first embodiment. Other configurations, effects, and the like of the leak hole determination device 5 of the present embodiment are the same as those of the leak hole determination device 5 of the first and second embodiments. Further, also in the present embodiment, the components indicated by the same reference numerals as those shown in the first embodiment are the same as those of the first and second embodiments.

Seventh Embodiment

The present embodiment shows an example in which the leak hole determination device 5 includes the pressurizing pump 64, and in which the leak hole determiner 53 uses the first pressure determination and the second pressure determination as shown in the fifth embodiment. When it is determined by the difference determination that the absolute value of the pressure difference between the two pressure detectors 51 and 52 after the limit pressure does not exceed the predetermined difference threshold value, the leak hole determiner 53 of the present embodiment determines that a leak hole X is present in the device system in case of detecting at least one of (i) and (ii) in the following, i.e., (i) the first pressure determination in which the pressure detected by the first pressure detector 51 after the limit pressure exceeds the predetermined first pressure threshold value, and (ii) the second pressure determination, in which the pressure detected by the second pressure detector 52 after the limit pressure exceeds the second pressure threshold value.

Further, when the leak hole determiner 53 of the present embodiment determines by the difference determination that the absolute value of the pressure difference between the two pressure detectors 51 and 52 after the limit pressure exceeds the predetermined difference threshold value, the leak hole determiner 53 determines that a leak hole is present in the device system when it is detected that the pressure detected by one of the first and second pressure detectors 51, 52 detecting a higher pressure exceeds predetermined pressure threshold value. More specifically, when the leak hole determiner 53 of the present embodiment determines by the difference determination that the absolute value of the pressure difference between the two pressure detectors 51 and 52 after the limit pressure exceeds the predetermined difference threshold value, it is determined that a leak hole X is present in the device system in case that the second pressure determination detects that the pressure detected by the second pressure detector 52 exceeds the predetermined second pressure threshold value.

The flowchart of the determination method of the leak hole determination device 5 of the present embodiment is the same as that of the third and fifth embodiments, and is therefore omitted.

The configuration of the evaporated fuel processing device 1 of the present embodiment is the same as that of the evaporated fuel processing device 1 of the first embodiment. Other configurations, effects, and the like of the leak hole determination device 5 of the present embodiment are the same as those of the leak hole determination device 5 of the fifth embodiment. Further, also in the present embodiment, the components indicated by the same reference numerals as those shown in the first and fifth embodiments are the same as those of the first and fifth embodiments.

Eighth Embodiment

The present embodiment shows an example in which the leak hole determination device 5 includes the pressurizing pump 64, and the leak hole determiner 53 changes the second pressure threshold value of the seventh embodiment. In the leak hole determiner 53 of the present embodiment, when the absolute value of the pressure difference between the two pressure detectors 51 and 52 after the limit pressure exceeds the predetermined difference threshold value, the leak hole determiner 53 estimates that the pressure detected by the second pressure detector 52 is increased under the influence of the fuel component remaining in the absorbent 32 of the canister 3, and the leak hole determiner 53 is configured to change the second pressure threshold value in such case.

When the leak hole determiner 53 of the present embodiment determines by the difference determination that the absolute value of the pressure difference between the two pressure detectors 51 and 52 after the limit pressure does not exceed the predetermined difference threshold value, it is determined that a leakage hole X is present in the device system in case of detecting at least one of the following (i) and (ii), i.e., (i) by the first pressure determination, the pressure detected by the first pressure detector 51 after the limit pressure exceeds the initially set first pressure threshold value, and (ii) by the second pressure determination, the pressure detected by the second pressure detector 52 after the limit pressure exceeds the initially set second pressure threshold value.

Further, when the leak hole determiner 53 of the present embodiment determines by the difference determination that the absolute value of the pressure difference between the two pressure detectors 51 and 52 after the limit pressure exceeds the predetermined difference threshold value, the second pressure threshold value is configured to be changed from the initial setting value to the absorption threshold value smaller than the initial setting value. Then, upon detecting at least one of (i) the second pressure determination, in which the pressure detected by the second pressure detector 52 after the limit pressure exceeds the absorption threshold value serving as the second pressure threshold value, and (ii) the first pressure determination, in which the pressures of the first pressure detector 51 after the time of pressure exceeds the initially set first pressure threshold value, it is determined by the leak hole determiner 53 that a leak hole X is present in the device system.

The flowchart of the determination method of the leak hole determination device 5 of the present embodiment is the same as that of the fourth and sixth embodiments, and is therefore omitted.

The configuration of the evaporated fuel processing device 1 of the present embodiment is the same as that of the evaporated fuel processing device 1 of the first embodiment. Other configurations, effects, and the like of the leak hole determination device 5 of the present embodiment are the same as those of the leak hole determination device 5 of the sixth embodiment. Further, also in the present embodiment, the components indicated by the same reference numerals as those shown in the first and sixth embodiments are the same as those of the first and sixth embodiments.

Figure 16:
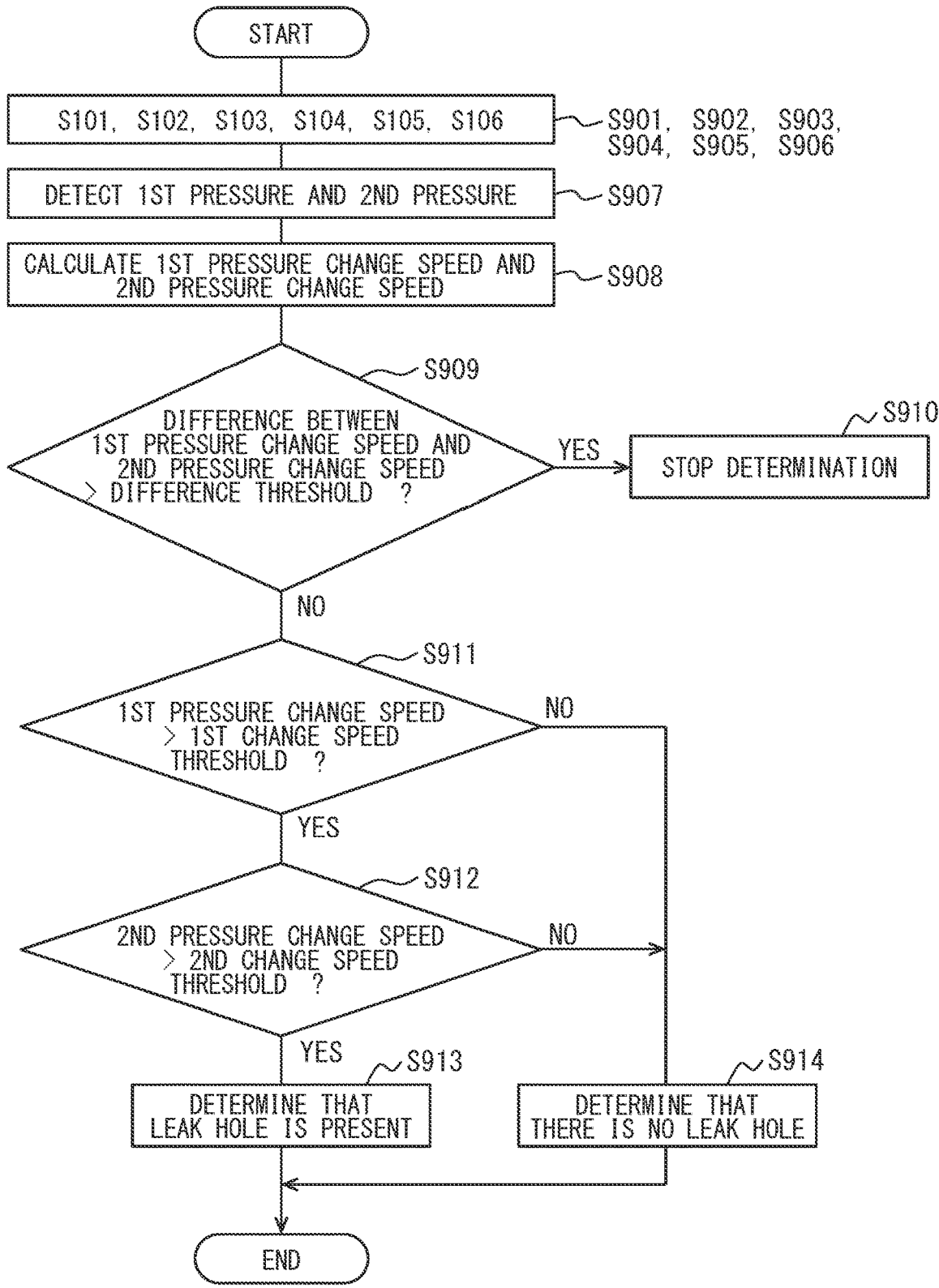
FIG. 16 is a flowchart showing a determination method of the leak hole determination device according to a ninth embodiment.

Ninth Embodiment, FIG. 16

In the present embodiment, an example is described in which, when it is determined that the absolute value of the difference between the pressure change speeds by the two pressure detectors 51 and 52 after the limit pressure exceeds the predetermined difference threshold value, such a situation is estimated that at least one of the pressure detected by the first pressure detector 51 and the pressure detected by second pressure detector 52 is affected by the fuel component remaining in the canister 3, thereby stopping/aborting the determination of the presence or absence of a leak hole X. In the present embodiment, unlike the cases of the first to eighth embodiments, when it is estimated that the fuel component remains in the absorbent 32 of the canister 3, the presence or absence of the leak hole X is not determined.

(Determination Method)

A method of determining the presence or absence of a leak hole X by the leak hole determination device 5 in the present embodiment is described with reference to the flowchart of FIG. 16. The leak hole determiner 53 and the control unit 54 of the leak hole determination device 5 of the present embodiment firstly perform steps S901 to S906 similar to steps S101 to S106 of the first embodiment. Then, after the depressurization operation by the decompression pump 62 or the pressurization operation by the pressurizing pump 64 is stopped, the leak hole determiner 53 detects the first pressure and the second pressure within a predetermined time from the limit pressure timing at which the depressurization operation or the pressurization operation is stopped (Step S907).

Then, the leak hole determiner 53 calculates the change speed of the first pressure within the predetermined time from the limit pressure timing, and also calculates the change speed of the second pressure within the predetermined time from the limit pressure timing (Step S908). Then, as a difference determination, the leak hole determiner 53 determines whether or not the absolute value of the difference between the change speed of the first pressure and the change speed of the second pressure exceeds the predetermined difference threshold value (Step S909).

When the absolute value of the difference exceeds the predetermined difference threshold value, the leak hole determiner 53 stops the determination of the presence or absence of the leak hole X (Step S910). On the other hand, when the absolute value of the difference is equal to or less than the predetermined difference threshold value, the leak hole determiner 53 determines whether or not the change speed of the first pressure exceeds the first change speed threshold value as the first change speed determination (Step S911). When the change speed of the first pressure exceeds the first change speed threshold value, the leak hole determiner 53 determines whether the change speed of the second pressure exceeds the second change speed threshold value as the second change speed determination (Step S912).

In such a situation, when the change speed of the first pressure exceeds the first change speed threshold value and the change speed of the second pressure exceeds the second change speed threshold value, the leak hole determiner 53 can determine that a leak hole of a predetermined size or more is present in the device system (Step S913). On the other hand, when the change speed of the first pressure is equal to or less than the first change speed threshold value, or when the change speed of the second pressure is equal to or less than the second change speed threshold value, the leak hole determiner 53 can determine that no leak hole X of a predetermined size or more is present in the device system (Step S914).

In the leak hole determination device 5 of the present embodiment, when it is estimated that the change speed of the first pressure or the change speed of the second pressure is influenced by the fuel component remaining in the absorbent 32 of the canister 3, the determination of the presence or absence of the leak hole X is stopped. As a result, although it may not be possible to determine the presence or absence of the leak hole X, it is possible to improve the determination accuracy when determining the presence or absence of the leak hole X.

The configuration of the evaporated fuel processing device 1 of the present embodiment is the same as that of the first embodiment. Other configurations, effects, and the like of the leak hole determination device 5 of the present embodiment are the same as those of the leak hole determination device 5 of the first embodiment. Further, also in the present embodiment, the components indicated by the same reference numerals as those shown in the first embodiment are the same as those of the first embodiment.

Other Embodiments

In the first to ninth embodiments, the leak hole determiner 53 may switchably/interchangeably use (i) the difference determination in the pressure change speeds of the two pressure detectors 51 and 52 and (ii) the difference determination of the pressures of the two pressure detectors 51 and 52, as appropriate. Further, (i) the case where the first change speed determination and the second change speed determination are performed and (ii) the case where the first pressure determination and the second pressure determination are performed may be appropriately changed. Each speed determination and each pressure determination may be used in combination with a pressure change speed or a difference determination using pressure, if necessary.

Further, the limit pressure may also be realized as a lower limit pressure or an upper limit pressure established under specific conditions of pressure and temperature, in addition to being forcibly established by using the decompression pump 62 or the pressurizing pump 64.

Figure 17:
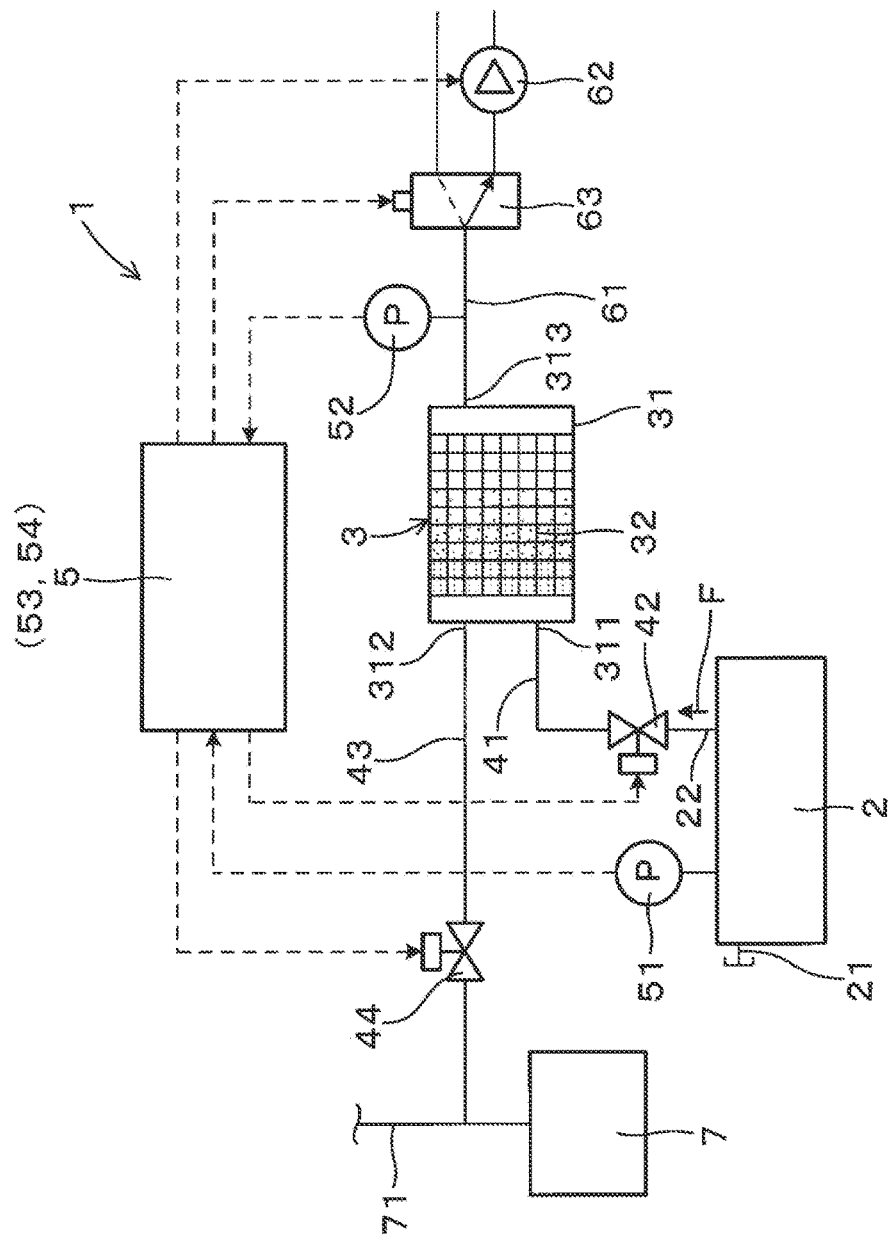
FIG. 17 is an explanatory diagram showing a configuration of the evaporated fuel processing device and the leak hole determination device according to other embodiment.

Further, as shown in FIG. 17, the absorbent 32 in the canister 3 may be arranged not to block the inlet 311 and the outlet 312 of the canister case 31. In such case, after the limit pressure timing after the end of the depressurization operation, when the decompression pipe 61 has a leak hole X of a predetermined size or more, the pressure or the pressure change speed detected by the first pressure detector 51 becomes high, thereby causing a difference in pressure or pressure change speed between the pressure detectors 51 and 52. Further, after the limit pressure timing after the end of the pressurization operation in such case, when the purge pipe 43, the vapor pipe 41 or the fuel tank 2 has a leak hole X of a predetermined size or more, the pressure or the pressure change speed of the second pressure detector 52 is hard to decrease, and there is a difference caused in the pressure or in the pressure change speed between the two pressure detectors 51 and 52.

The present disclosure is not limited to the embodiments described above, but it is possible to configure further different embodiments without departing from the gist of the present disclosure. Further, the present disclosure includes various modifications, modifications within an equivalent range, and the like. Furthermore, combinations, forms, and the like of various components derived from the present disclosure are also included in the technical concept of the present disclosure.

What is claimed is:

1. A leak hole determination device located in an evaporated fuel processing system and configured to determine a presence or an absence of a leak hole the system, wherein the system includes: the device; a fuel tank; and a canister for absorbing an evaporated fuel discharged from the fuel tank, and wherein the device comprises:
   a first pressure detector configured to detect a first pressure in the fuel tank;
   a second pressure detector configured to detect a second pressure in the canister; and
   a leak hole determiner configured to determine whether a leak hole is present or not by using either of (A) a change speed difference between a first pressure change speed of the first pressure detected by the first pressure detector and a second pressure change speed of the second pressure detected by the second pressure detector after a limit pressure timing or (B) a pressure difference between the first pressure detected by the first pressure detector and the second pressure detected by the second pressure detector after the limit pressure timing, wherein
   the limit pressure timing is a timing at which the first pressure detected by the first pressure detector and the second pressure detected by the second pressure detector respectively take a limit pressure value due to a pressurization operation or a depressurization operation for pressurizing or depressurizing an inside of the system.

2. The leak hole determination device of claim 1, wherein the leak hole determiner determines presence or absence of the leak hole by performing: a difference determination; and at least one of a first change speed determination and a second change speed determination,
   wherein the difference determination determines whether an absolute value of the change speed difference or of the pressure difference exceeds a predetermined difference threshold value,
   wherein the first change speed determination determines whether a change speed of the first pressure detected by the first pressure detector at and after the limit pressure timing exceeds a predetermined first change speed threshold value, and
   wherein the second change speed determination determines whether a change speed of the second pressure detected by the second pressure detector at and after the limit pressure timing exceeds a predetermined second change speed threshold value.

3. The leak hole determination device of claim 1, wherein the leak hole determiner determines presence or absence of the leak hole by performing:
   a difference determination; and at least one of a first pressure determination and a second pressure determination,
   wherein the difference determination determines whether an absolute value of the change speed difference or the pressure difference exceeds a predetermined difference threshold value,
   wherein the first pressure determination determines whether a first pressure detected by the first pressure detector at and after the limit pressure timing exceeds a predetermined first pressure threshold value, and
   wherein the second pressure determination determines whether a second pressure detected by the second pressure detector at and after the limit pressure timing exceeds a predetermined second pressure threshold value.

4. The leak hole determination device of claim 2, wherein the leak hole determiner changes, when the absolute value of the change speed difference or the pressure difference exceeds the predetermined difference threshold value, at least one of the predetermined first change speed threshold value and the predetermined second change speed threshold value, based on an estimation that at least one of the first pressure detected by the first pressure detector and the second pressure detected by the second pressure detector is under an influence of a fuel component remaining in the canister.

5. The leak hole determination device of claim 3, wherein the leak hole determiner changes, when the absolute value of the change speed difference or the pressure difference exceeds the predetermined difference threshold value, at least one of the predetermined first pressure threshold value and the predetermined second pressure threshold value, based on an estimation that at least one of the first pressure detected by the first pressure detector and the second pressure detected by the second pressure detector is under an influence of a fuel component remaining in the canister.

6. The leak hole determination device of claim 2, wherein the leak hole determiner is configured to switch, depending on whether the absolute value of the change speed difference or the pressure difference exceeding the predetermined difference threshold value or the absolute value of the change speed difference or the pressure difference not exceeding the predetermined difference threshold value, two determination schemes among which a scheme A uses one of the first change speed determination and the second change speed determination and a scheme B uses both of the first and second change speed determinations.

7. The leak hole determination device of claim 3, wherein the leak hole determiner is configured to switch, depending on whether the absolute value of the change speed difference or the pressure difference exceeding the predetermined difference threshold value or the absolute value of the change speed difference or the pressure difference not exceeding the predetermined difference threshold value, two determination schemes among which a first scheme uses one of the first pressure determination and the second pressure determination and a second scheme uses both of the first and second pressure determinations.

8. The leak hole determination device of claim 2, wherein the leak hole determiner stops the determination of presence or absence of the leak hole, when the absolute value of the change speed difference or the pressure difference exceeds the predetermined difference threshold value, based on an estimation that at least one of the pressure detected by the first pressure detector and the pressure detected by the second pressure detector is under an influence of a fuel component remaining in the canister.

9. The leak hole determination device of claim 1 further comprising:
a pump capable of performing a pressurization operation or a depressurization operation respectively pressurizing or depressurizing an inside of the system, wherein
the limit pressure timing is a timing at which an operation of the pump is stopped after the operation of the pump is started.

10. The leak hole determination device of claim 1, wherein
the leak hole determiner is configured to:
calculate the first pressure change speed detected by the first pressure detector based on (i) an amount of change of the first pressure detected by the first pressure detector within a predetermined time from the limit pressure timing or (ii) a time derivative value of the first pressure detected by the first pressure detector, and
calculate the second pressure change speed detected by the second pressure detector based on (i) an amount of change of the second pressure detected by the second pressure detector within a predetermined time from the limit pressure timing or (ii) a time derivative value of the second pressure detected by the second pressure detector.

11. The leak hole determination device of claim 1, wherein
the leak hole determiner has a position estimation function that estimates a position of the leak hole in the device system of the evaporated fuel processing device by using the change speed difference or the pressure difference.

12. A leak hole determination device configured for an evaporated fuel processing system, the leak hole determination device comprising:
a processor; and
a non-transitory computer-readable storage medium,
wherein the leak hole determination device is configured to:
start a depressurization operation;
detect a first pressure at a fuel-tank side of a canister, and detect a second pressure at a non-fuel-tank side of the canister;
determine that the first pressure and the second pressure exceed a predetermined pressure;
stop the depressurization operation;
detect the first pressure and the second pressure after a predetermined delay;
calculate a first recompression rate and a second recompression rate;
wherein the leak hole determination device is further configured to perform a first branch, a second branch, a third branch, and a fourth branch, wherein:
the first branch includes:
(i) determine that a difference between the first compression rate and that second compression rate is greater than a difference threshold,
(ii) determine that the first recompression rate is greater than a first recompression rate threshold, and
(iii) conclude that a substantial leak hole is present;
the second branch includes:

(i) determine that the difference between the first recompression rate and the second recompression rate is greater than the difference threshold,
(ii) determine that the first recompression rate is equal to or smaller than the first recompression rate threshold, and
(iii) conclude that the substantial leak hole is not present;
the third branch includes
(i) determine that the difference between the first recompression rate and the second recompression rate is equal to or smaller than the difference threshold,
(ii) determine that the second recompression rate is greater than a second recompression rate threshold, and
(iii) conclude that the substantial leak hole is present; and
the fourth branch includes:
(i) determine that the difference between the first recompression rate and the second recompression rate is equal to or smaller than the difference threshold,
(ii) determine that the second recompression rate is equal to or smaller than the second recompression rate threshold, and
(iii) conclude that the substantial leak hole is not present.

13. The leak hole determination device of claim 12, wherein the leak hole determination device is further configured to:
determine whether a difference between the first recompression rate and the second recompression rate is greater than a difference threshold;
upon a determination that the difference between the first recompression rate and the second recompression rate is greater than a difference threshold, increase a first recompression rate threshold; and
upon a determination that the difference between the first recompression rate and the second recompression rate is equal to or smaller than the difference threshold, do not increase the first recompression rate threshold.

14. The leak hole determination device of claim 13, wherein the leak hole determination device is further configured to perform a first branch, a second branch, and a third branch, wherein:
the first branch includes:
(i) determine that the first recompression rate is greater than the first recompression rate threshold,
(ii) determine that the second recompression rate is greater than a second recompression rate threshold,
(iii) conclude that a substantial leak hole is present;
the second branch includes:
(i) determine that the first recompression rate is greater than the first recompression rate threshold,
(ii) determine that the second recompression rate is equal to or smaller than the second recompression rate threshold,
(iii) conclude that the substantial leak hole is not present; and
the third branch includes:
(i) determine that the first recompression rate is equal to or smaller than the first recompression rate threshold, and (ii) conclude that the substantial leak hole is not present.

\* \* \* \* \*